(12) United States Patent
Yasuhiko et al.

(10) Patent No.: US 12,553,825 B2
(45) Date of Patent: Feb. 17, 2026

(54) OBSERVATION DEVICE AND OBSERVATION METHOD

(71) Applicant: HAMAMATSU PHOTONICS K.K., Hamamatsu (JP)

(72) Inventors: Osamu Yasuhiko, Hamamatsu (JP); Kozo Takeuchi, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 86 days.

(21) Appl. No.: 18/703,745

(22) PCT Filed: Sep. 29, 2022

(86) PCT No.: PCT/JP2022/036576
§ 371 (c)(1),
(2) Date: Apr. 23, 2024

(87) PCT Pub. No.: WO2023/095440
PCT Pub. Date: Jun. 1, 2023

(65) Prior Publication Data
US 2025/0003873 A1    Jan. 2, 2025

(30) Foreign Application Priority Data
Nov. 29, 2021  (JP) ................. 2021-192921

(51) Int. Cl.
*G01N 21/45* (2006.01)
*G02B 21/14* (2006.01)
*G02B 21/36* (2006.01)

(52) U.S. Cl.
CPC ............. *G01N 21/45* (2013.01); *G02B 21/14* (2013.01); *G02B 21/361* (2013.01); *G02B 21/365* (2013.01)

(58) Field of Classification Search
CPC ........ G01N 21/45; G01N 21/41; G02B 21/14; G02B 21/361; G02B 21/365; G02B 21/00
See application file for complete search history.

(56) References Cited

U.S. PATENT DOCUMENTS

2006/0058682 A1* 3/2006 Miller ................ G01B 9/02007
                                                                    600/476
2008/0242992 A1* 10/2008 Criton ................. G01S 15/8995
                                                                    600/447
(Continued)

FOREIGN PATENT DOCUMENTS

EP         4194923 A1    6/2023
JP      2017-219826 A   12/2017
(Continued)

OTHER PUBLICATIONS

International Preliminary Report on Patentability mailed Jun. 13, 2024 for PCT/JP2022/036576.
(Continued)

*Primary Examiner* — Tony Ko
(74) *Attorney, Agent, or Firm* — Faegre Drinker Biddle & Reath LLP

(57) ABSTRACT

An observation apparatus includes a light source, a mirror, a condenser lens, an objective lens, a beam splitter, an imaging unit, and an analysis unit. The analysis unit includes an interference intensity image acquisition unit, a first complex amplitude image generation unit, a second complex amplitude image generation unit, a two-dimensional phase image generation unit, a three-dimensional phase image generation unit, a refractive index distribution calculation unit, and a third complex amplitude image generation unit. The analysis unit irradiates an observation object with light along each of a plurality of light irradiation directions by changing an orientation of a reflection surface of the mirror, acquires an interference intensity image for each of the (Continued)

plurality of light irradiation directions from the imaging unit, and performs necessary processing based on the interference intensity images to obtain a three-dimensional refractive index distribution of the observation object.

16 Claims, 29 Drawing Sheets

(56) References Cited

U.S. PATENT DOCUMENTS

2020/0217643 A1* 7/2020 Schnell .............. G01N 21/4788
2021/0137387 A1* 5/2021 Frisken ................ A61B 3/1025

FOREIGN PATENT DOCUMENTS

| | | |
|---|---|---|
| JP | 2019-124679 A | 7/2019 |
| JP | 2019-144121 A | 8/2019 |
| WO | WO-2019/044336 A1 | 3/2019 |
| WO | WO-2020/013325 A1 | 1/2020 |
| WO | WO-2022/054305 A1 | 3/2022 |

OTHER PUBLICATIONS

European Search Report issued on Oct. 21, 2025 in corresponding European patent application 22898225.2.

* cited by examiner x DIRECTION DIFFERENTIAL y DIRECTION DIFFERENTIAL x DIRECTION DIFFERENTIAL y DIRECTION DIFFERENTIAL (a)

(b)

(a)

(b)

(a)

(b)

(a)

(b)

(a)

(b)

OBSERVATION DEVICE AND OBSERVATION METHOD

TECHNICAL FIELD

The present disclosure relates to an observation apparatus and an observation method.

BACKGROUND ART

In recent years, a technique for producing a three-dimensional cell tissue called a spheroid or an organoid has been developed. Further, a study for applying the above three-dimensional cell tissues to drug development, regenerative medicine, and the like has been developed. The above three-dimensional cell tissue is an optically transparent multiple scattering object. As a technique for imaging the optically transparent scattering object, various methods have been proposed.

In these techniques, examples of an imaging technique using a fluorescent probe include a confocal microscope, a multiphoton microscope, and a light sheet microscope. In addition, as a non-staining and non-invasive imaging technique without using a fluorescent probe, optical coherence tomography (OCT) or the like is known.

The non-staining and non-invasive imaging is often desired for an observation object such as the spheroid or the organoid, however, there are not many reports in which the OCT has been applied to the imaging of the above observation object. The reason may be that a resolution of the imaging by the OCT is low, and it is difficult to interpret a signal obtained by the imaging by the OCT. Therefore, it can be said that the non-staining imaging technique for the three-dimensional cell tissue which can be a gold standard has not been established at the present stage.

A quantitative phase imaging (QPI) is also known as a technique capable of imaging an optical path length of the observation object in a non-staining and non-invasive manner. The QPI can acquire physical information such as the optical path length of the observation object (for example, a cell), and thus, application of the QPI is progressing in a biological field. Images acquired by the QPI can be used to generate other types of images, such as a differential interference image and a phase contrast microscope image.

The QPI is a technique capable of acquiring an image having a relatively large amount of information, and is expected to be applicable to a higher content analysis than a conventional analysis using a bright field image. Further, the high content analysis using the non-staining imaging technique has been actively studied due to improvement in image recognition accuracy by machine learning in recent years, and the non-staining imaging of the multiple scattering object is expected to play an important role in the future. However, the QPI cannot grasp a true three-dimensional structure because the acquired image is merely a two-dimensional projection of the optical path length.

Further, optical diffraction tomography (ODT) described in Patent Document 1 is also known as a technique capable of imaging the optical path length of the observation object in a non-staining and non-invasive manner. The ODT is a development of the QPI into a technique capable of three-dimensional imaging, and can realize three-dimensional refractive index tomography of the observation object. Performing cell observation using the ODT enables identification of organelles such as cell nuclei and mitochondria, and further, enables tracking of three-dimensional structural changes, and is expected to enable higher content analysis than the QPI.

CITATION LIST

Patent Literature

Patent Document 1: Japanese Patent Application Laid-Open Publication No. 2017-219826

SUMMARY OF INVENTION

Technical Problem

However, although the conventional ODT can be applied to the observation of several cells, it is difficult to apply the ODT to the observation of the multiple scattering object such as the three-dimensional cell tissue described above. This is because, in the conventional ODT, when a large amount of multiple scattered light occurs in the observation object, influence of the multiple scattered light significantly appears in the acquired image.

Light scattering refers to a phenomenon in which light interacts with an object to change a traveling direction of the light. In particular, when spatial non-uniformity of a refractive index in the object increases, the light interacts with the object many times in passing through the object. The light which interacts with the object many times as described above is referred to as the multiple scattered light. On the other hand, the light which interacts with the object only once is referred to as single scattered light. It is known that the multiple scattered light causes an increase in speckle and a deterioration in single-scattering to multi-scattering ratio (SMR), and thus, becomes a barrier for performing the measurement.

The speckle is generated by a large change in intensity or phase caused spatially by interference of the multiple scattered light when the light is temporally and spatially coherent. In order to suppress speckle generation, a light source which outputs temporally or spatially incoherent light may be used. For example, a general bright field microscope such as a phase contrast microscope acquires an image without speckles by using a spatially and temporally incoherent light source such as a halogen lamp, a light emitting diode, or the like.

The deterioration of the SMR is caused by that the multiple scattered light becomes dominant over the single scattered light, and the single scattered light is buried in the multiple scattered light. As the observation object becomes larger and an observation depth becomes deeper, a component of the single scattered light exponentially decreases, whereas a component of the multiple scattered light increases.

A scattering direction of the single scattered light has a direct correspondence relationship with a structure of the object, and thus, it is easily used to measure the structure of the object. On the other hand, the relationship between the multiple scattered light and the structure of the object is complex, and it is difficult to extract information on the structure of the object. Therefore, in the imaging technique using the single scattered light, it is known that the measurement fails when the single scattered light is buried in the multiple scattered light (that is, when the SMR deteriorates).

The suppression of the SMR deterioration is possible by a technique called gating for selectively detecting the single scattered light out of the single scattered light and the multiple scattered light. The multiple scattered light is suppressed by the gating, and thus, the speckles can be suppressed at the same time as the SMR deterioration is suppressed. The gating is achieved using degrees of freedom such as space, time, and polarization. The confocal microscope is an example of the spatial gating. The OCT is an example of the temporal and spatial gating.

The conventional ODT does not remove the influence of the multiple scattered light, and thus, the speckle increases in the acquired image and the SMR deteriorates, when the multiple scattered light generated in the observation object is large. Therefore, although the conventional ODT can be applied to the observation of several cells in which the occurrence of the multiple scattered light is small, it is difficult to apply the ODT to the observation of the multiple scattering object such as the three-dimensional cell tissue in which the occurrence of the multiple scattered light is large.

An object of an embodiment is to provide an observation apparatus and an observation method capable of observing an observation object while reducing influence of multiple scattered light even when the observation object is a multiple scattering object.

Solution to Problem

An embodiment is an observation apparatus. The observation apparatus includes (1) an interference intensity image acquisition unit for acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation unit for generating, for each of the plurality of light irradiation directions, a complex amplitude image based on the interference intensity image; (3) a second complex amplitude image generation unit for generating, for each of the plurality of light irradiation directions, a complex amplitude image at each of a plurality of positions between a first position and a second position based on a complex amplitude image at the first position with respect to a distance from the imaging unit along a light propagation path; (4) a two-dimensional phase image generation unit for generating, for each of the plurality of positions, a complex differential interference image of each of the plurality of light irradiation directions based on the complex amplitude image of each of the plurality of light irradiation directions, and generating a two-dimensional phase image based on the complex differential interference image of each of the plurality of light irradiation directions; (5) a three-dimensional phase image generation unit for generating a three-dimensional phase image between the first position and the second position based on the two-dimensional phase image at each of the plurality of positions; (6) a refractive index distribution calculation unit for obtaining a three-dimensional refractive index distribution of the observation object between the first position and the second position based on the three-dimensional phase image; and (7) a third complex amplitude image generation unit for generating, for each of the plurality of light irradiation directions, a complex amplitude image at the second position based on the complex amplitude image at the first position and the three-dimensional refractive index distribution, and based on the complex amplitude image generated by the first complex amplitude image generation unit, respective processing steps of the second complex amplitude image generation unit, the two-dimensional phase image generation unit, the three-dimensional phase image generation unit, the refractive index distribution calculation unit, and the third complex amplitude image generation unit are sequentially performed.

An embodiment is an observation method. The observation method includes (1) an interference intensity image acquisition step of acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation step of generating, for each of the plurality of light irradiation directions, a complex amplitude image based on the interference intensity image; (3) a second complex amplitude image generation step of generating, for each of the plurality of light irradiation directions, a complex amplitude image at each of a plurality of positions between a first position and a second position based on a complex amplitude image at the first position with respect to a distance from the imaging unit along a light propagation path; (4) a two-dimensional phase image generation step of generating, for each of the plurality of positions, a complex differential interference image of each of the plurality of light irradiation directions based on the complex amplitude image of each of the plurality of light irradiation directions, and generating a two-dimensional phase image based on the complex differential interference image of each of the plurality of light irradiation directions; (5) a three-dimensional phase image generation step of generating a three-dimensional phase image between the first position and the second position based on the two-dimensional phase image at each of the plurality of positions; (6) a refractive index distribution calculation step of obtaining a three-dimensional refractive index distribution of the observation object between the first position and the second position based on the three-dimensional phase image; and (7) a third complex amplitude image generation step of generating, for each of the plurality of light irradiation directions, a complex amplitude image at the second position based on the complex amplitude image at the first position and the three-dimensional refractive index distribution, and based on the complex amplitude image generated in the first complex amplitude image generation step, respective processing steps of the second complex amplitude image generation step, the two-dimensional phase image generation step, the three-dimensional phase image generation step, the refractive index distribution calculation step, and the third complex amplitude image generation step are sequentially performed.

An embodiment is a program. The program is a program for causing a computer to execute the steps of the observation method of the above configuration.

An embodiment is a recording medium. The recording medium is a computer readable recording medium recording the program of the above configuration.

Advantageous Effects of Invention

According to the observation apparatus and the observation method of the embodiments, it is possible to observe an observation object while reducing influence of multiple scattered light even when the observation object is a multiple scattering object.

DESCRIPTION OF EMBODIMENTS

Hereinafter, embodiments of an observation apparatus and an observation method will be described in detail with reference to the accompanying drawings. In the description of the drawings, the same elements will be denoted by the same reference signs, and redundant description will be omitted. The present invention is not limited to these examples, and the Claims, their equivalents, and all the changes within the scope are intended as would fall within the scope of the present invention.

Figure 1:
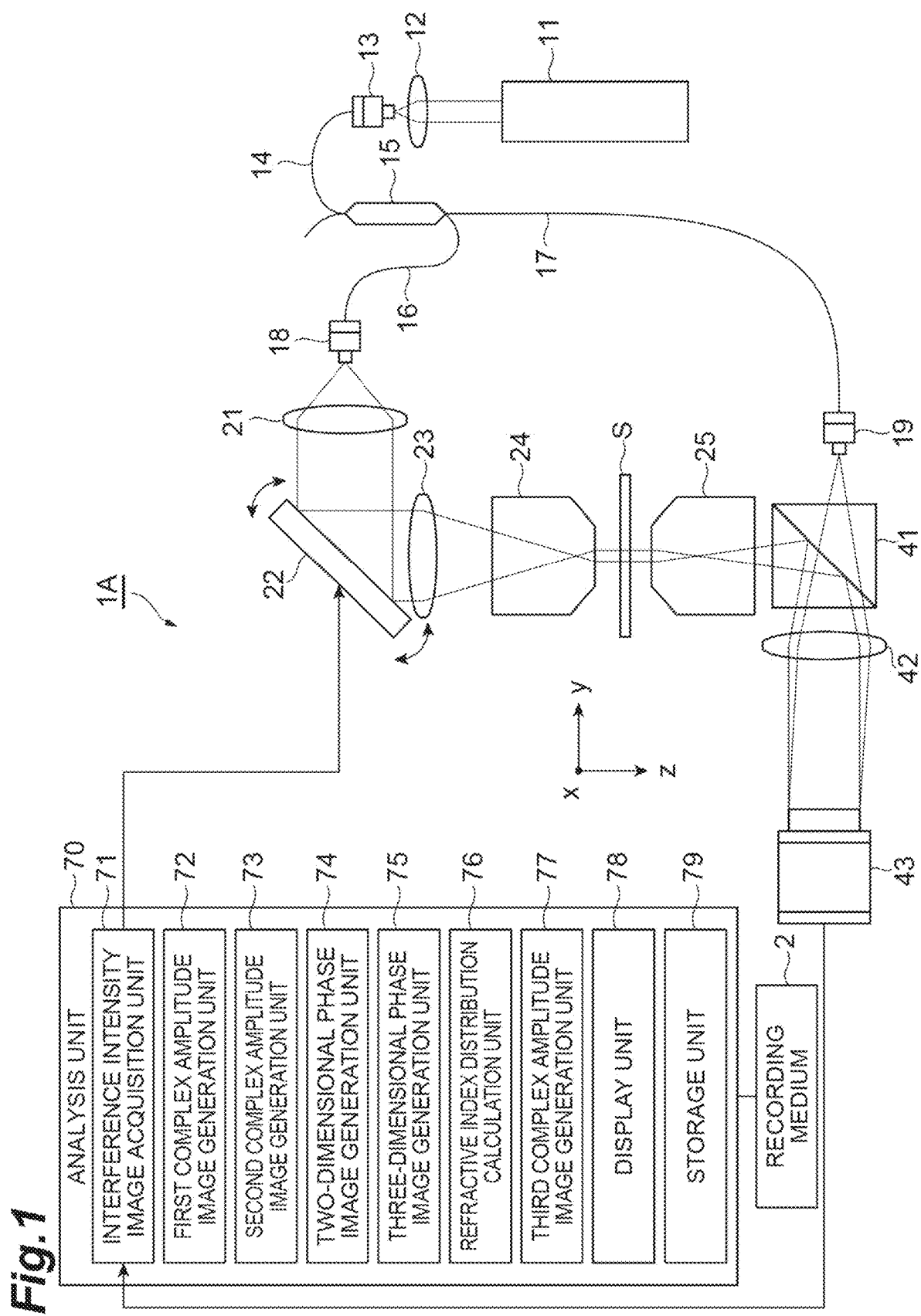
FIG. 1 is a diagram illustrating a configuration of an observation apparatus 1A.

FIG. 1 is a diagram illustrating a configuration of an observation apparatus 1A. The observation apparatus 1A includes a light source 11, a lens 12, a lens 21, a mirror 22, a lens 23, a condenser lens 24, an objective lens 25, a beam splitter 41, a lens 42, an imaging unit 43, and an analysis unit 70.

The light source 11 outputs spatially and temporally coherent light, and is preferably a laser light source. The lens 12 is optically coupled to the light source 11, focuses the light output from the light source 11 on a light input end 13 of an optical fiber 14, and inputs the light to the light input end 13. The optical fiber 14 guides the light input to the light input end 13 by the lens 12 to a fiber coupler 15.

The fiber coupler 15 couples the light between the optical fiber 14 and optical fibers 16 and 17, splits the light guided by and arriving from the optical fiber 14 into two light beams, guides one split light by the optical fiber 16, and guides the other split light by the optical fiber 17. The light guided by the optical fiber 16 is output as diverging light from a light output end 18. The light guided by the optical fiber 17 is output as diverging light from a light output end 19.

The lens 21 is optically coupled to the light output end 18, and collimates the light output as the diverging light from the light output end 18. The mirror 22 is optically coupled to the lens 21, and reflects the light arriving from the lens 21 to the lens 23. An orientation of a reflection surface of the mirror 22 is changeable. The lens 23 is optically coupled to the mirror 22. The condenser lens 24 is optically coupled to the lens 23. The lens 23 and the condenser lens 24 preferably constitute a 4$f$ optical system.

The lens 23 and the condenser lens 24 irradiate an observation object S with the light from a light irradiation direction according to the orientation of the reflection surface of the mirror 22. The objective lens 25 is optically coupled to the condenser lens 24. The observation object S is disposed between the objective lens 25 and the condenser lens 24. The objective lens 25 inputs the light (object light) output from the condenser lens 24 and passed through the observation object S, and outputs the light to the beam splitter 41.

The beam splitter 41 is optically coupled to the objective lens 25, and further, is optically coupled also to the light output end 19. The beam splitter 41 combines the light (object light) output and arriving from the objective lens 25 and the light (reference light) output and arriving from the light output end 19, and outputs the light to the lens 42. The lens 42 is optically coupled to the beam splitter 41, collimates the object light and the reference light arriving from the beam splitter 41, and outputs the light to the imaging unit 43.

The imaging unit 43 is optically coupled to the lens 42, and images an interference fringe image (interference intensity image) generated by interference between the object light and the reference light arriving from the lens 42. An incident direction of the reference light is inclined with respect to an incident direction of the object light on an imaging plane of the imaging unit 43. A position at which the object light and the reference light are combined by the beam splitter 41 may be in the subsequent stage of the imaging lens, and in addition, in consideration of the influence of aberration, it is desirable that the position is set between the objective lens 25 and the lens 42 as illustrated in the diagram.

The analysis unit 70 is electrically connected to the imaging unit 43, and inputs the interference intensity image captured by the imaging unit 43. The analysis unit 70 calculates a three-dimensional refractive index distribution of the observation object S by processing the input interference intensity image. The analysis unit 70 may be a computer. The analysis unit 70 includes an interference intensity image acquisition unit 71, a first complex amplitude image generation unit 72, a second complex amplitude image generation unit 73, a two-dimensional phase image generation unit 74, a three-dimensional phase image generation unit 75, a refractive index distribution calculation unit 76, a third complex amplitude image generation unit 77, a display unit 78, and a storage unit 79.

The interference intensity image acquisition unit 71 irradiates the observation object S with the light along each of a plurality of light irradiation directions by changing the orientation of the reflection surface of the mirror 22. Further, the interference intensity image acquisition unit 71 acquires the interference intensity image at a reference position for each of the plurality of light irradiation directions from the imaging unit 43.

The interference intensity image acquisition unit 71 includes a CPU, has an output port for outputting a control signal for changing the orientation of the reflection surface of the mirror 22, and has an input port for inputting the interference intensity image from the imaging unit 43. It is not necessary to move the objective lens 25 in an optical axis direction. The reference position is an image plane position having a conjugate relationship with respect to the imaging plane of the imaging unit 43.

The first complex amplitude image generation unit 72, the second complex amplitude image generation unit 73, the two-dimensional phase image generation unit 74, the three-dimensional phase image generation unit 75, the refractive index distribution calculation unit 76, and the third complex amplitude image generation unit 77 perform processing based on the interference intensity images, and include a processing device such as a CPU, a DSP, or an FPGA. The display unit 78 displays an image to be processed, an image in the middle of the processing, an image after the processing, and the like, and includes, for example, a liquid crystal display.

The storage unit 79 stores data of various images, and includes a hard disk drive, a flash memory, a RAM, a ROM, and the like. The first complex amplitude image generation unit 72, the second complex amplitude image generation unit 73, the two-dimensional phase image generation unit 74, the three-dimensional phase image generation unit 75, the refractive index distribution calculation unit 76, the third complex amplitude image generation unit 77, and the storage unit 79 may be constituted by a cloud computing.

The storage unit 79 also stores a program for causing the interference intensity image acquisition unit 71, the first complex amplitude image generation unit 72, the second complex amplitude image generation unit 73, the two-dimensional phase image generation unit 74, the three-dimensional phase image generation unit 75, the refractive index distribution calculation unit 76, and the third complex amplitude image generation unit 77 to execute respective steps of the processing. The program may be stored in the storage unit 79 at the time of manufacture or shipment of the observation apparatus 1A, may be acquired via a communication line after shipment and then stored in the storage unit 79, or may be recorded in a computer readable recording medium 2 and then stored in the storage unit 79. The recording medium 2 may be an arbitrary medium such as a flexible disk, a CD-ROM, a DVD-ROM, a BD-ROM, a USB memory, or the like.

The details of the processing step of each of the interference intensity image acquisition unit 71, the first complex amplitude image generation unit 72, the second complex amplitude image generation unit 73, the two-dimensional phase image generation unit 74, the three-dimensional phase image generation unit 75, the refractive index distribution calculation unit 76, and the third complex amplitude image generation unit 77 will be described later.

Figure 2:
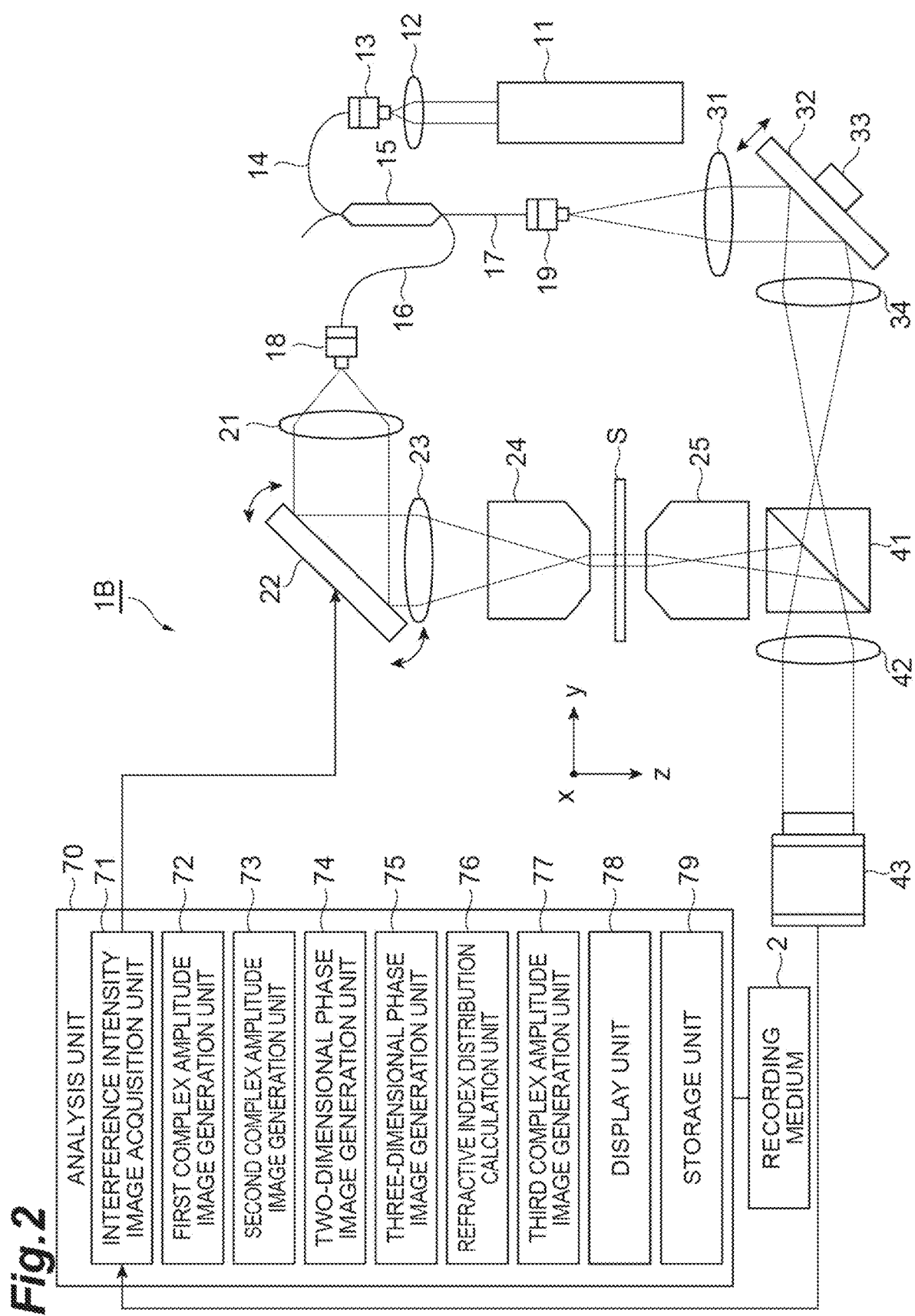
FIG. 2 is a diagram illustrating a configuration of an observation apparatus 1B.

FIG. 2 is a diagram illustrating a configuration of an observation apparatus 1B. The observation apparatus 1B illustrated in FIG. 2 includes a lens 31, a mirror 32, and a lens 34 in addition to the configuration of the observation apparatus 1A illustrated in FIG. 1.

The lens 31 is optically coupled to the light output end 19, and collimates the light (reference light) output as diverging light from the light output end 19. The mirror 32 is optically coupled to the lens 31, and reflects the light arriving from the lens 31 to the lens 34. The lens 34 is optically coupled to the mirror 32, and outputs the light arriving from the mirror 32 to the beam splitter 41.

The light output from the lens 34 is once focused before the beam splitter 41, and then input to the beam splitter 41 as diverging light. The beam splitter 41 combines the light (object light) output and arriving from the objective lens 25 and the light (reference light) output and arriving from the lens 34, and outputs the light to the lens 42 in a coaxial manner. The imaging unit 43 images the interference fringe image (interference intensity image) generated by interference between the object light and the reference light arriving from the lens 42. The incident direction of the reference light is parallel to the incident direction of the object light on the imaging plane of the imaging unit 43.

A drive unit 33 moves the mirror 32 in a direction perpendicular to a reflection surface of the mirror 32. The drive unit 33 is, for example, a piezoelectric actuator. The movement of the mirror 32 changes an optical path difference (phase difference) of the object light and the reference light from light splitting by the fiber coupler 15 to combining by the beam splitter 41. When the optical path difference is different, the interference intensity image captured by the imaging unit 43 is also different.

The observation apparatus is not limited to the configuration examples illustrated in FIG. 1 and FIG. 2, and various modifications are possible. In the configuration of the observation apparatus 1A (FIG. 1) and the observation apparatus 1B (FIG. 2), the light transmitted through the observation object S is the object light, and the light reflected by the observation object S may be the object light as in a configuration of an observation apparatus 1C (FIG. 3) described below.

Figure 3:
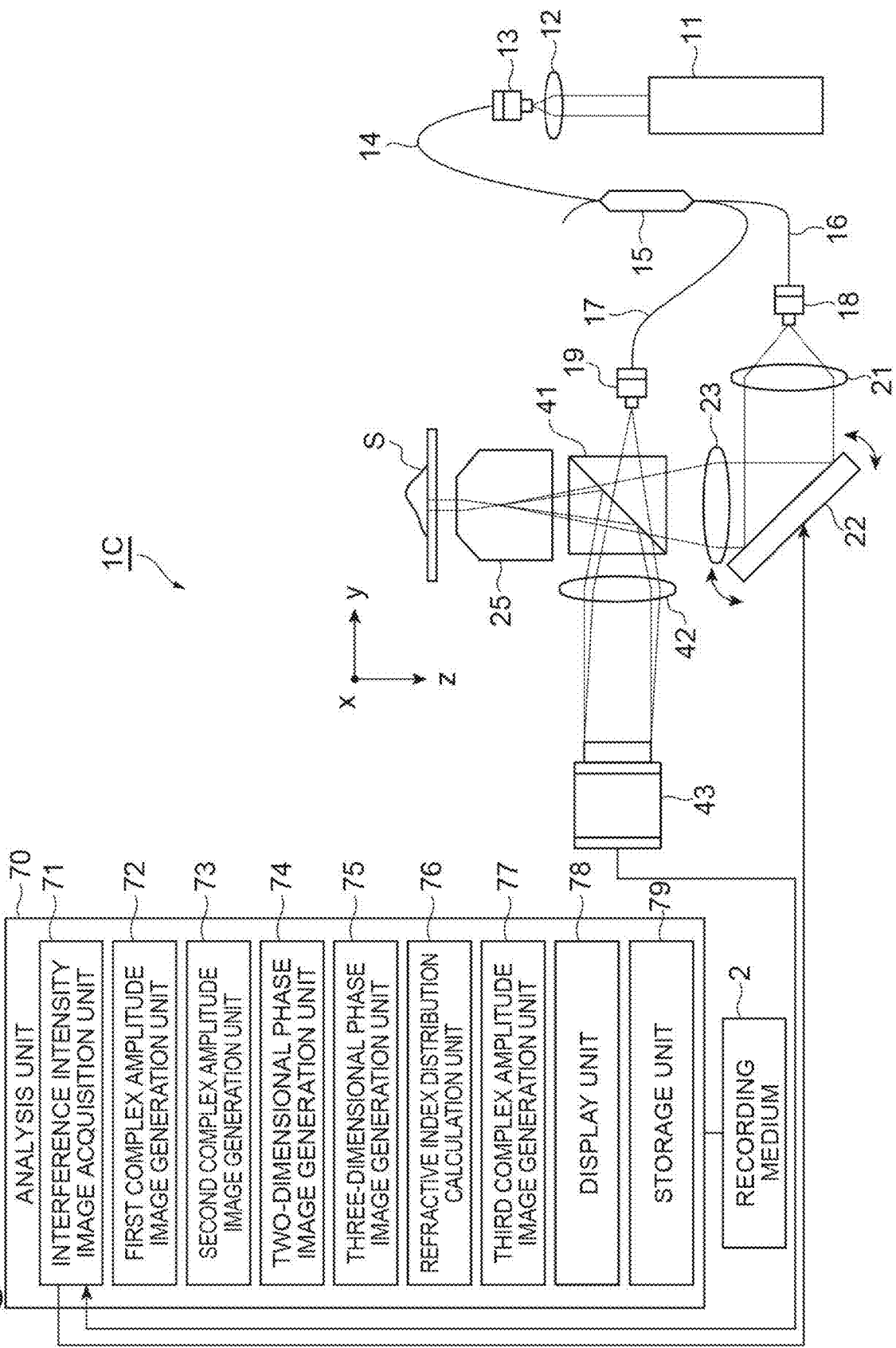
FIG. 3 is a diagram illustrating a configuration of an observation apparatus 1C.

FIG. 3 is a diagram illustrating a configuration of an observation apparatus 1C. The observation apparatus 1C includes the light source 11, the lens 12, the lens 21, the mirror 22, the lens 23, the objective lens 25, the beam splitter 41, the lens 42, the imaging unit 43, and the analysis unit 70. Hereinafter, differences from the observation apparatus 1A (FIG. 1) will be mainly described.

The lens 21 is optically coupled to the light output end 18 of the optical fiber 16, and collimates the light output as diverging light from the light output end 18. The mirror 22 is optically coupled to the lens 21, and reflects the light arriving from the lens 21 to the lens 23. The orientation of the reflection surface of the mirror 22 is changeable. The lens 23 is optically coupled to the mirror 22. The objective lens 25 is optically coupled to the lens 23.

The beam splitter 41 is disposed between the lens 23 and the objective lens 25. The lens 23 and the objective lens 25 preferably constitute a 4$f$ optical system. The lens 23 and the objective lens 25 irradiate the observation object S with the light from the light irradiation direction according to the orientation of the reflection surface of the mirror 22. The objective lens 25 inputs the light (object light) reflected from the observation object S, and outputs the light to the beam splitter 41.

The beam splitter 41 is optically coupled to the objective lens 25, and further, is optically coupled also to the light output end 19 of the optical fiber 17. The beam splitter 41 combines the light (object light) output and arriving from the objective lens 25 and the light (reference light) output and arriving from the light output end 19, and outputs the light to the lens 42. The lens 42 is optically coupled to the beam splitter 41, collimates the object light and the reference light arriving from the beam splitter 41, and outputs the light to the imaging unit 43.

The imaging unit 43 is optically coupled to the lens 42, and images the interference fringe image (interference intensity image) generated by interference between the object light and the reference light arriving from the lens 42. The incident direction of the reference light is inclined with respect to the incident direction of the object light on the imaging plane of the imaging unit 43. The position at which the object light and the reference light are combined by the beam splitter 41 may be in the subsequent stage of the imaging lens, and in addition, in consideration of the influence of aberration, it is desirable that the position is set between the objective lens 25 and the lens 42 as illustrated in the diagram.

In the configuration of the observation apparatus 1C (FIG. 3), as in the observation apparatus 1B (FIG. 2), the mechanism (the lens 31, the mirror 32, the drive unit 33, and the lens 34 in FIG. 2) for changing the optical path length of the reference light may be provided for changing the optical path difference (phase difference) of the object light and the reference light from light splitting by the fiber coupler 15 to combining by the beam splitter 41. In this case, the incident direction of the reference light may be parallel to the incident direction of the object light on the imaging plane of the imaging unit 43.

Figure 4:
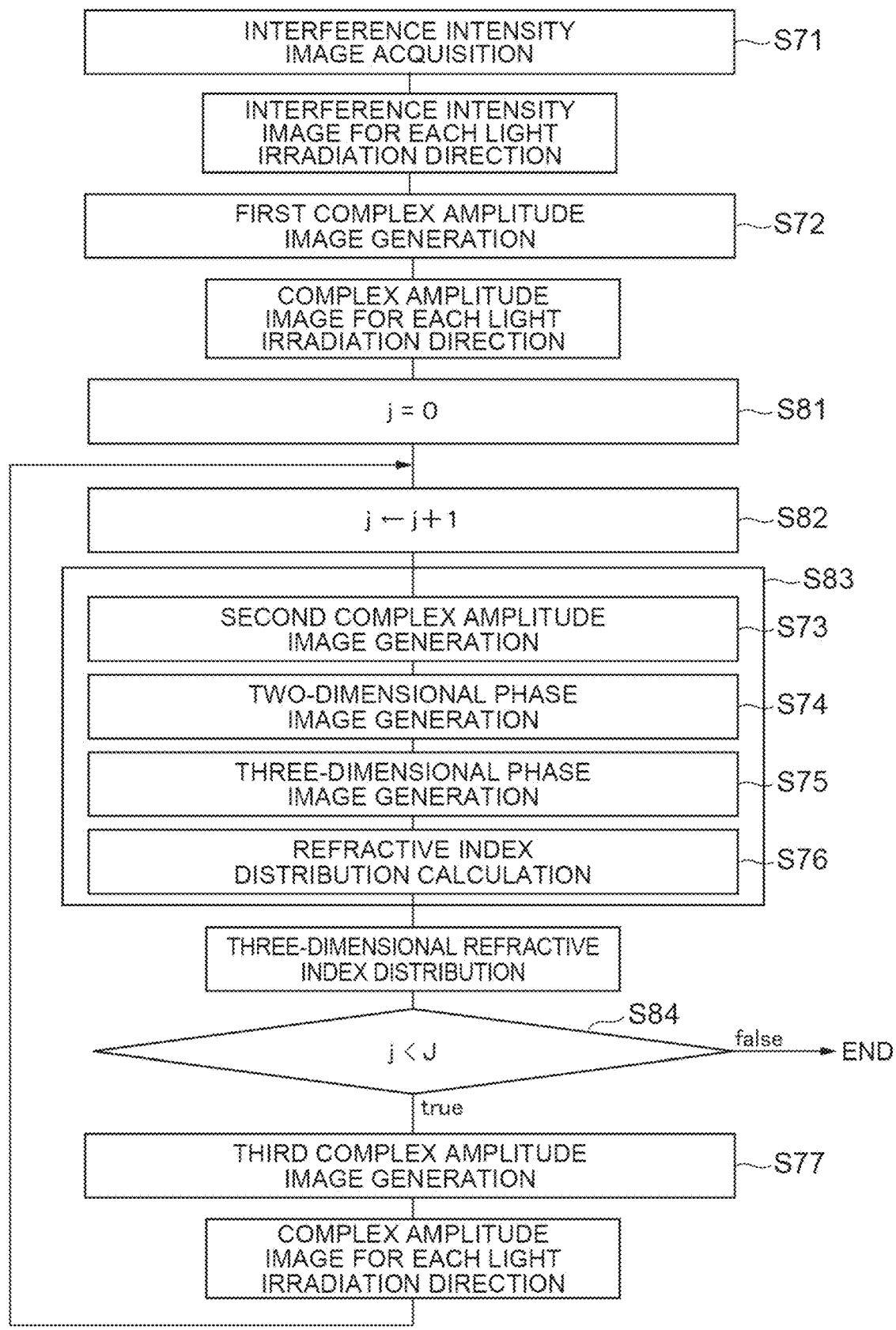
FIG. 4 is a flowchart of an observation method.
Figure 5:
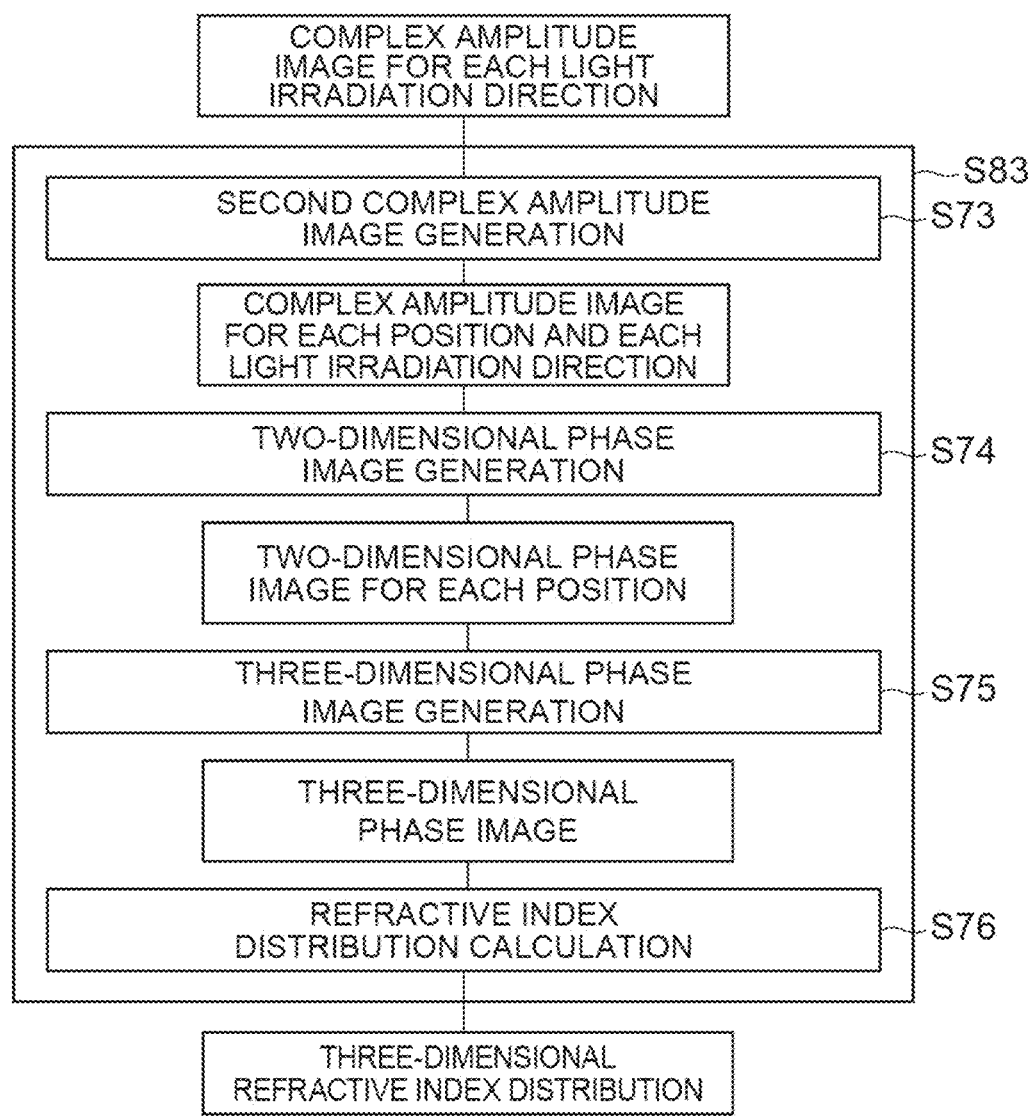
FIG. 5 is a flowchart of the observation method.

FIG. 4 and FIG. 5 are flowcharts of an observation method. FIG. 5 illustrates a part of the flowchart illustrated in FIG. 4. This observation method can be applied to each of the observation apparatus 1A (FIG. 1), the observation apparatus 1B (FIG. 2), and the observation apparatus 1C (FIG. 3). The observation method includes an interference intensity image acquisition step S71, a first complex amplitude image generation step S72, a second complex amplitude image generation step S73, a two-dimensional phase image generation step S74, a three-dimensional phase image generation step S75, a refractive index distribution calculation step S76, and a third complex amplitude image generation step S77.

The processing step of the interference intensity image acquisition step S71 is performed by the interference intensity image acquisition unit 71. The processing step of the first complex amplitude image generation step S72 is performed by the first complex amplitude image generation unit 72. The processing step of the second complex amplitude image generation step S73 is performed by the second complex amplitude image generation unit 73.

The processing step of the two-dimensional phase image generation step S74 is performed by the two-dimensional phase image generation unit 74. The processing step of the three-dimensional phase image generation step S75 is performed by the three-dimensional phase image generation unit 75. The processing step of the refractive index distribution calculation step S76 is performed by the refractive index distribution calculation unit 76. The processing step of the third complex amplitude image generation step S77 is performed by the third complex amplitude image generation unit 77.

In the interference intensity image acquisition step S71, the interference intensity image acquisition unit 71 irradiates the observation object S with the light along each of the plurality of light irradiation directions by changing the orientation of the reflection surface of the mirror 22. Further, the interference intensity image acquisition unit 71 acquires the interference intensity image at the reference position for each of the plurality of light irradiation directions from the imaging unit 43.

In each of FIG. 1, FIG. 2, and FIG. 3, an xyz orthogonal coordinate system is illustrated for convenience of explanation. The z axis is parallel to the optical axis of the objective lens 25. The reference position is the image plane position having a conjugate relationship with respect to the imaging plane of the imaging unit 43. This position is set to z=0. The light irradiation direction on the observation object S can be represented by $k_x$ and $k_y$ in a wavenumber vector $(k_x, k_y, k_z)$ of the irradiation light.

Figure 6:
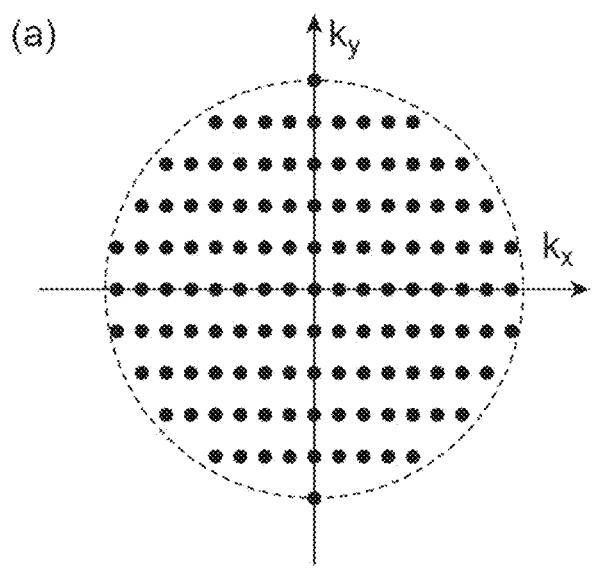
FIG. 6 includes (a)-(c) diagrams illustrating examples of scanning of a light irradiation direction on an observation object S in an interference intensity image acquisition step S71.
Figure 6:
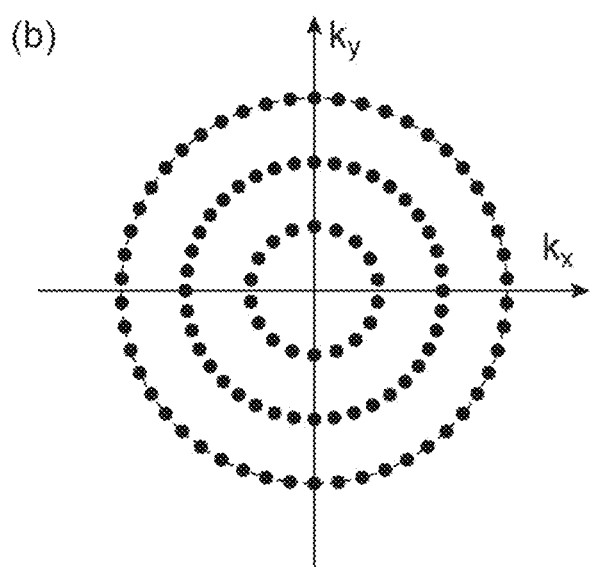
Figure 6:
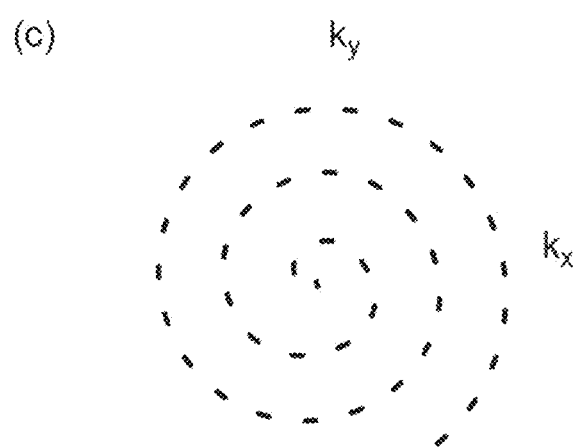

(a) to (c) in FIG. 6 are diagrams illustrating examples of scanning of the light irradiation direction on the observation object S in the interference intensity image acquisition step S71. In the diagram, a position of each circular point represents the light irradiation direction in the $k_x k_y$ plane in which the horizontal axis is set to $k_x$ and the vertical axis is set to $k_y$. The scanning of the light irradiation direction may be arranged in a rectangular lattice shape in the $k_x k_y$ plane as illustrated in (a) in FIG. 6, may be arranged on a circumference of each of a plurality of concentric circles in the $k_x k_y$ plane as illustrated in (b) in FIG. 6, or may be arranged in a spiral shape in the $k_x k_y$ plane as illustrated in (c) in FIG. 6.

In any of the cases, the light irradiation direction can be scanned as far as it is allowed by NA of the condenser lens 24 in the configuration of each of FIG. 1 and FIG. 2, or the objective lens 25 in the configuration of FIG. 3. Raster scan or random scan may be used. In the case of the raster scan, return scan may be performed or may not be performed.

In the first complex amplitude image generation step S72, the first complex amplitude image generation unit 72 generates, for each of the plurality of light irradiation directions, a complex amplitude image based on the interference intensity image acquired by the interference intensity image acquisition unit 71. In the case of the observation apparatus 1A (FIG. 1) or the observation apparatus 1C (FIG. 3), the first complex amplitude image generation unit 72 can generate the complex amplitude image based on one interference intensity image by a Fourier fringe analysis method.

In the case of the observation apparatus 1B (FIG. 2), the first complex amplitude image generation unit 72 can generate the complex amplitude image based on three or more interference intensity images having different optical path differences (phase differences) between the object light and the reference light by a phase shift method. The complex amplitude image generated in the first complex amplitude image generation step S72 may be an image at the same reference position as the interference intensity image, or may be an image at another position generated based on the complex amplitude image at the reference position.

In the second complex amplitude image generation step S73, the second complex amplitude image generation unit 73 generates, for each of the plurality of light irradiation directions, a complex amplitude image at each of a plurality of z direction positions between a first position and a second position based on the complex amplitude image at the first position with respect to a distance from the imaging unit 43 along a light propagation path.

Assuming that a two-dimensional Fourier transform of the complex amplitude image $u(x, y, 0)$ at the position of $z=0$ is $U(k_x, k_y, 0)$, the complex amplitude image $u(x, y, d)$ at the position of $z=d$ and the two-dimensional Fourier transform $U(k_x, k_y, d)$ of the complex amplitude image $u(x, y, d)$ are represented by the following Formulas of free propagation. i is an imaginary unit, and $k_0$ is a wavenumber of the light in the observation object.

[Formula 1]
$$U(k_x, k_y, d) = U(k_x, k_y, 0)\exp\left(i\sqrt{k_0^2 - k_x^2 - k_y^2}\, d\right) \quad (1)$$

[Formula 2]
$$u(x, y, d) = \int U(k_x, k_y, d)\exp(-ik_x x - ik_y y) dk_x dk_y \quad (2)$$

In the two-dimensional phase image generation step S74, the two-dimensional phase image generation unit 74 generates, for each of the plurality of positions, a two-dimensional phase image based on the complex amplitude image of each of the plurality of light irradiation directions generated by the second complex amplitude image generation unit 73. The two-dimensional phase image generated in this step corresponds to a phase image centered on the focused z direction position.

In addition, the two-dimensional phase image generation step S74 and the subsequent steps may be performed after all the complex amplitude images at the plurality of positions are generated for each of the plurality of light irradiation directions in the second complex amplitude image generation step S73. Further, processes of generating the complex amplitude image at one certain z direction position for each of the plurality of light irradiation directions in the second complex amplitude image generation step S73 and generating the two-dimensional phase image at the position in the two-dimensional phase image generation step S74 may be set as a unit, and the unit process may be repeatedly performed while scanning the z direction position. The latter case is preferable in that a capacity of image data to be stored in the storage unit 79 can be reduced.

In the three-dimensional phase image generation step S75, the three-dimensional phase image generation unit 75 generates a three-dimensional phase image between the first position and the second position based on the two-dimensional phase image at each of the plurality of positions generated by the two-dimensional phase image generation unit 74. The three-dimensional phase image generated in this step is an image in which the positions x and y in the two-dimensional phase image and the position z of the two-dimensional phase image are variables.

In the refractive index distribution calculation step S76, the refractive index distribution calculation unit 76 obtains a three-dimensional refractive index distribution of the observation object between the first position and the second position by deconvolution based on the three-dimensional phase image generated by the three-dimensional phase image generation unit 75.

Assuming that the refractive index distribution of the observation object is n (x, y, z), an electric susceptibility distribution is f (x, y, z), and a refractive index of a background medium is nm, there is a relationship of the following Formula (3) between them. The three-dimensional phase image $\Phi(x, y, z)$ generated by the three-dimensional phase image generation unit 75 is represented by convolution of a kernel function g(x, y, z) and the electric susceptibility distribution f(x, y, z) as shown in the following Formula (4). Therefore, the three-dimensional refractive index distribution n(x, y, z) of the observation object can be obtained by deconvolution based on the three-dimensional phase image $\Phi(x, y, z)$.

[Formula 3]
$$f(x, y, z) = k_0^2\left[\left(n(x, y, z)/n_m\right)^2 - 1\right] \quad (3)$$

[Formula 4]
$$\Phi(x, y, z) = \int g(x-x', y-y', z-z') f(x', y', z') dx' dy' dz' \quad (4)$$

Figure 7:
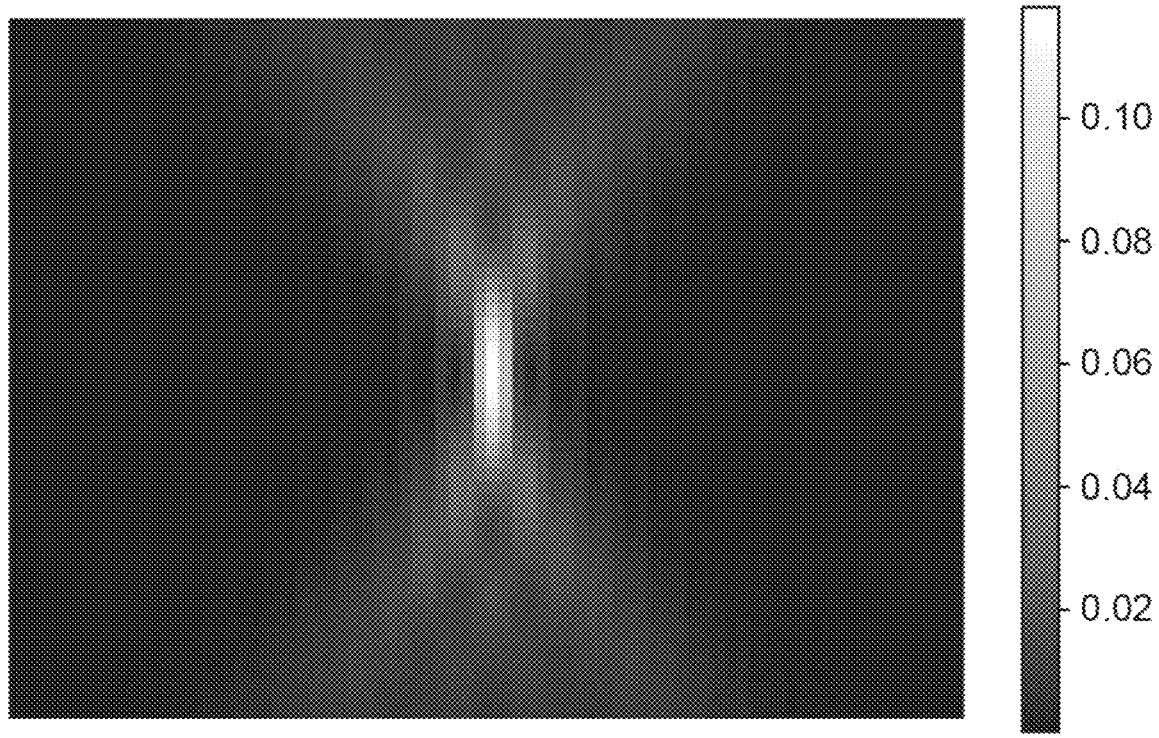
FIG. 7 is a diagram showing a kernel function g.

In addition, the kernel function g is a function based on a Green function corresponding to a solution of a wave equation. FIG. 7 is a diagram showing the kernel function g. In this diagram, a center position having the largest value of the kernel function g is the origin, the vertical direction is the z axis, and the horizontal direction is the direction perpendicular to the z axis.

In the third complex amplitude image generation step S77, the third complex amplitude image generation unit 77 generates, for each of the plurality of light irradiation directions, a complex amplitude image at the second position based on the complex amplitude image at the first position used in the second complex amplitude image generation step S73 and the three-dimensional refractive index distribution of the observation object between the first position and the second position calculated in the refractive index distribution calculation step S76.

In the step S83 including the second complex amplitude image generation step S73, the two-dimensional phase image generation step S74, the three-dimensional phase image generation step S75, and the refractive index distribution calculation step S76, the three-dimensional refractive index distribution of the observation object between the first position and the second position is obtained based on the complex amplitude image of the first position with respect to the distance from the imaging unit 43 along the light propagation path. The processing steps of the step S83 and the third complex amplitude image generation step S77 are repeatedly performed. This will be described with reference to FIG. 4, FIG. 5, FIG. 8, and FIG. 9.

Figure 8:
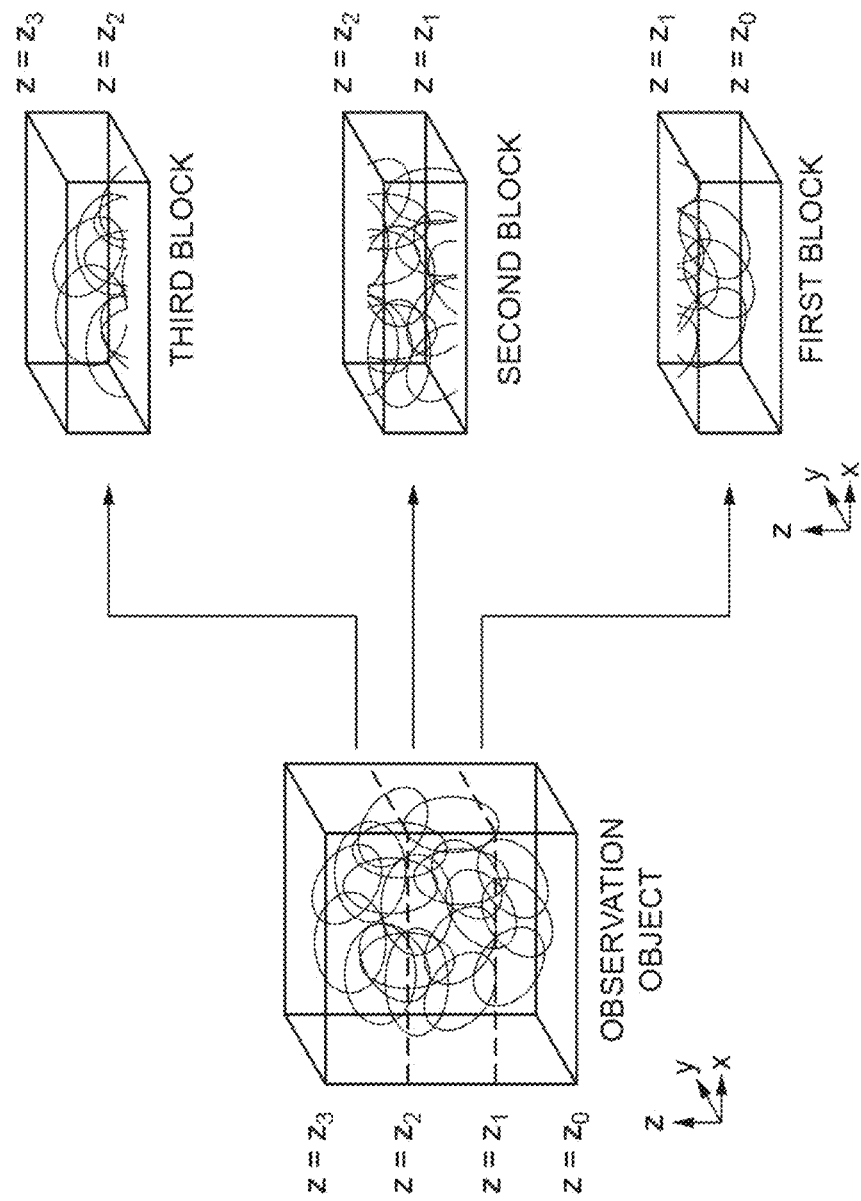
FIG. 8 is a diagram illustrating a relationship between a region including the observation object and first to J-th blocks.

FIG. 8 is a diagram illustrating a relationship between a region including the observation object and first to J-th blocks. As illustrated in this diagram, the region including the observation object is divided into the first to J-th blocks in order based on the distance from the imaging unit along the light propagation path (z direction). In this diagram, it is set to J=3. The j-th block in the first to J-th blocks is a region from $z=z_{j-1}$ to $z=z_j$. In each j-th block, a position (near end) of $z=z_{j-1}$ closest to the imaging unit is set as the first position, and a position (far end) of $z=z_j$ farthest from the imaging unit is set as the second position.

Figure 9:
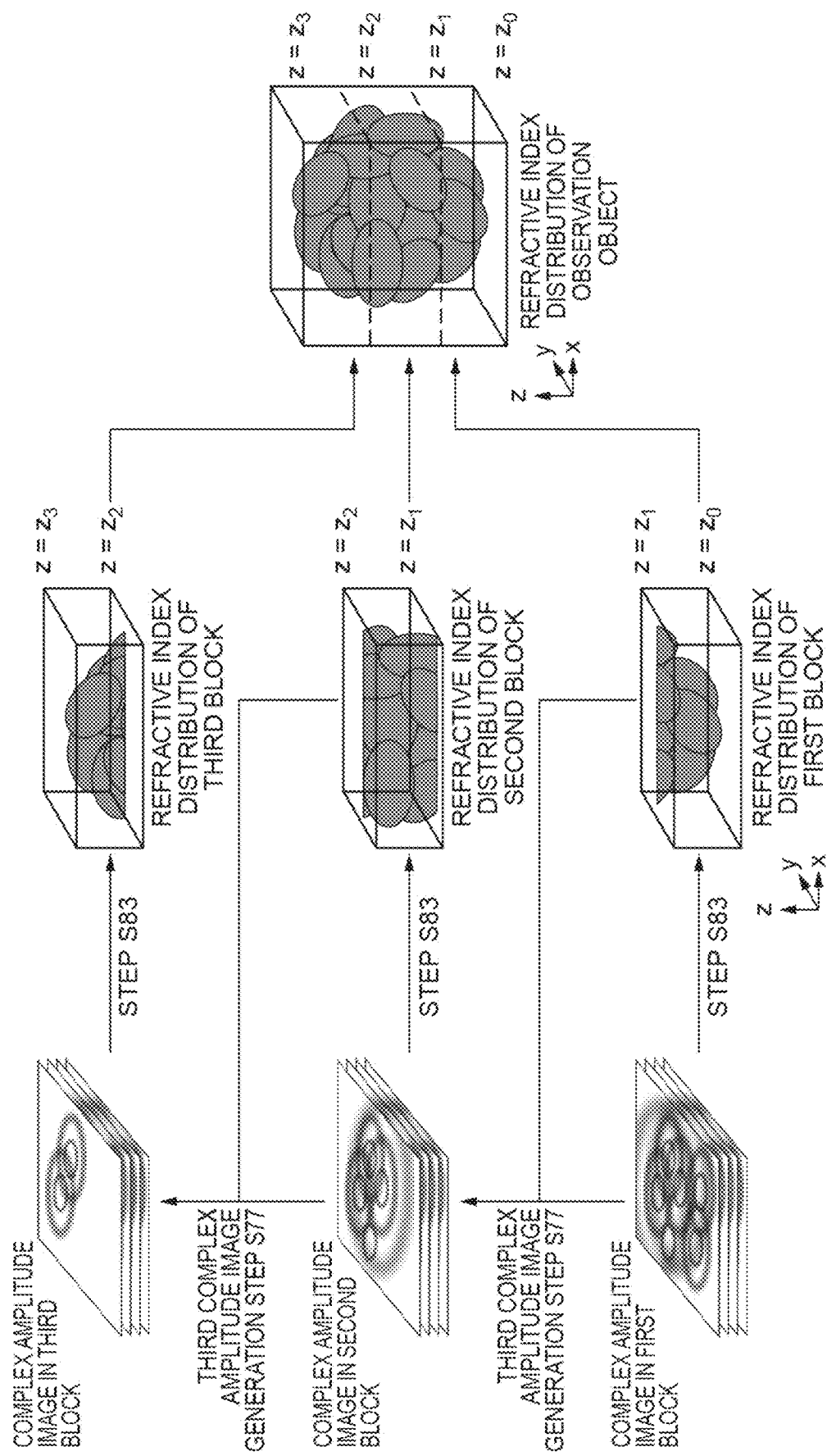
FIG. 9 is a diagram illustrating a processing procedure for the first to J-th blocks.

FIG. 9 is a diagram illustrating a processing procedure for the first to J-th blocks. As illustrated in this diagram, for each j-th block, in the step S83, the complex amplitude image and the two-dimensional phase image at each of the plurality of z direction positions from the first position to the second position are generated based on the complex amplitude image at the first position, the three-dimensional phase image between the first position and the second position is generated, and the three-dimensional refractive index distribution is obtained. For each j-th block, in the third complex amplitude image generation step S77, the complex amplitude image at the second position is generated based on the complex amplitude image at the first position and the three-dimensional refractive index distribution calculated in the step S83.

The complex amplitude image at the second position in the (j−1)-th block generated in the third complex amplitude image generation step S77 is used as the complex amplitude image at the first position in the next j-th block, and the processing steps of the step S83 and the third complex amplitude image generation step S77 are performed for the j-th block. When the three-dimensional refractive index distribution is obtained for each of the first to J-th blocks, the three-dimensional refractive index distribution of the entire observation object is obtained by combining these distributions.

As illustrated in FIG. 4 and FIG. 5, in the step S81 after the first complex amplitude image generation step S72, it is set to j=0, and in the subsequent step S82, the value of j is increased as j=1, and the processing steps of the step S83 and the third complex amplitude image generation step S77 are performed for the first block.

That is, for the first block closest to the imaging unit, based on the complex amplitude image generated in the first complex amplitude image generation step S72, a position of $z=z_0$ (near end) closest to the imaging unit is set as the first position, a position of $z=z_1$ (far end) farthest from the imaging unit is set as the second position, and the respective processing steps of the step S83 (the second complex amplitude image generation step S73, the two-dimensional phase image generation step S74, the three-dimensional phase image generation step S75, and the refractive index distribution calculation step S76) and the third complex amplitude image generation step S77 are sequentially performed. Thereafter, the process returns to the step S82.

For the j-th block (in this case, j is 2 or more and less than J), based on the complex amplitude image generated for the (j−1)-th block in the third complex amplitude image generation step S77, a position of $z=z_{j-1}$ (near end) closest to the imaging unit is set as the first position, a position of $z=z_j$ (far end) farthest from the imaging unit is set as the second position, and the respective processing steps of the step S83 (the second complex amplitude image generation step S73, the two-dimensional phase image generation step S74, the three-dimensional phase image generation step S75, and the refractive index distribution calculation step S76) and the third complex amplitude image generation step S77 are sequentially performed. Thereafter, the process returns to the step S82.

For the J-th block which is the last block farthest from the imaging unit, based on the complex amplitude image generated for the (J−1)-th block in the third complex amplitude image generation step S77, a position of $z=z_{J-1}$ (near end) closest to the imaging unit is set as the first position, a position of $z=z_J$ (far end) farthest from the imaging unit is set as the second position, and the processing step of the step S83 (the second complex amplitude image generation step S73, the two-dimensional phase image generation step S74, the three-dimensional phase image generation step S75, and the refractive index distribution calculation step S76) is performed.

For the J-th block, it is determined to be the last block in the step S84 after the step S83, and may be ended without proceeding to the third complex amplitude image generation step S77. In addition, for the J-th block, it may be determined to be the last block after the three-dimensional phase image generation step S75, and may be ended without proceeding to the refractive index distribution calculation step S76, and in this case, the three-dimensional phase image of the entire observation object is obtained.

In addition, the region including the observation object may be divided into the two blocks in order based on the distance from the imaging unit along the light propagation path (z direction), and in this case, the processing for the first block and the processing for the last J-th block described above may be performed.

Further, the region including the observation object may not be divided into the plurality of blocks, and in this case, the respective processing steps of the step S83 (the second complex amplitude image generation step S73, the two-dimensional phase image generation step S74, the three-dimensional phase image generation step S75, and the refractive index distribution calculation step S76) and the third complex amplitude image generation step S77 may be sequentially performed only once.

Figure 10:
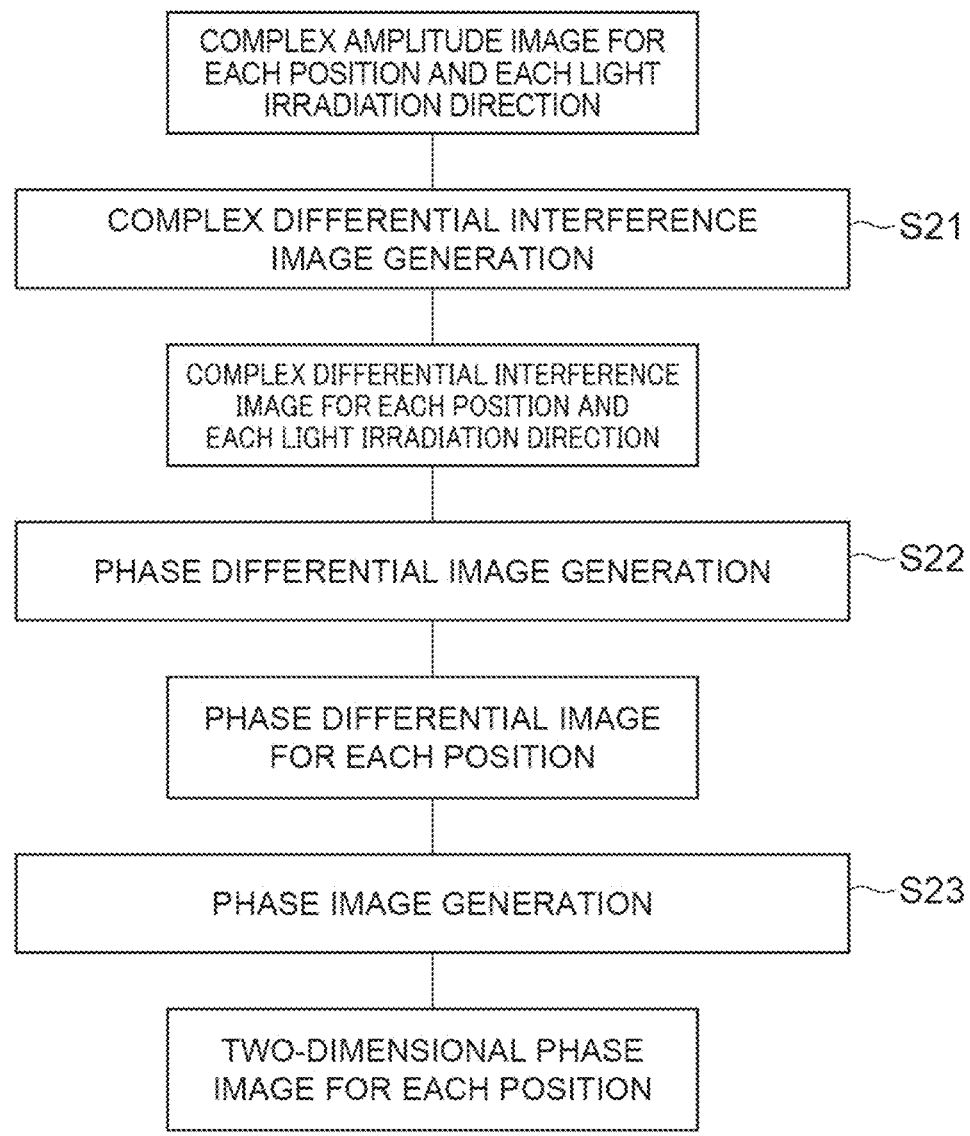
FIG. 10 is a flowchart of a two-dimensional phase image generation step S74.

Next, the details of the two-dimensional phase image generation step S74 will be described. In the two-dimensional phase image generation step S74, the two-dimensional phase image generation unit 74 generates, for each of the plurality of positions, the two-dimensional phase image based on the complex amplitude image of each of the plurality of light irradiation directions FIG. 10 is a flowchart of the two-dimensional phase image generation step S74. The two-dimensional phase image generation step S74 generates, for each of the plurality of positions, in a step S21, a complex differential interference image of each of the plurality of light irradiation directions based on the complex amplitude image of each of the plurality of light irradiation directions. In a step S22, the step generates a phase differential image based on a summation of the complex differential interference images of the plurality of light irradiation directions. In a step S23, the step generates the two-dimensional phase image based on the phase differential image.

Assuming that the complex amplitude image at the position of z=d is u(x, y, d), the complex differential interference image q(x, y, d) generated in the step S21 is represented by the following Formula (5). At least one of δx and δy is non-zero. When δx≠0 and δy=0, the complex differential interference image q in which the x direction is a shear direction is obtained. When δx=0 and δy≠0, the complex differential interference image q in which the y direction is the shear direction is obtained. When δx≠0 and δy≠0, the complex differential interference image q with the shear direction different from both of the x direction and the y direction is obtained. In addition, the complex differential interference image q(x, y, d) may be obtained by Formula (5) after transforming the complex amplitude image u(x, y, d) as in the following Formula (6).

[Formula 5]
$$q(x, y, d) = u^*(x + \delta x, y + \delta y, d) \cdot u(x, y, d) \quad (5)$$

[Formula 6]
$$u(x, y, d)\exp(-ik_x x - ik_y y) \quad (6)$$

Assuming that the summation of the complex differential interference images q of the plurality of light irradiation directions is $q_{sum}$ (x, y, d), the phase differential image φ(x, y, z) generated in the step S22 is represented by the following Formula (7) as the phase of $q_{sum}$ (x, y, d). In the step S23, the two-dimensional phase image can be generated by performing integration or deconvolution of the phase differential image φ(x, y, z).

[Formula 7]
$$\phi(x, y, d) = \angle q_{sum}(x, y, d) \quad (7)$$

In addition, in the step S21, the complex differential interference image may be generated for each of a plurality of shear directions different from each other on the complex amplitude image. In this case, the two-dimensional phase image generation step S74 generates, for each of the plurality of positions, in the step S21, the complex differential interference image of each of the plurality of light irradiation directions for each of the plurality of shear directions on the image different from each other based on the complex amplitude image of each of the plurality of light irradiation directions. In the step S22, the step generates the phase differential image based on the summation of the complex differential interference images of the plurality of light irradiation directions for each of the plurality of shear directions. In the step S23, the step generates the two-dimensional phase image based on the phase differential image of each of the plurality of shear directions.

The influence of the multiple scattered light is reduced in the phase differential image generated based on the summation of the complex differential interference image of each of the plurality of light irradiation directions in the step S22. Further, the three-dimensional refractive index distribution obtained finally in the refractive index distribution calculation step S76 also reduces the influence of the multiple scattered light, and suppresses the speckles. Further, when the complex differential interference image is generated for each of the plurality of shear directions different from each other on the complex amplitude image in the step S21, it is possible to suppress the appearance of linear noises in the two-dimensional phase image obtained in the step S23.

In the above description, the case in which the two-dimensional phase image is generated by performing integration or deconvolution of the phase differential image in the step S23 is described. However, the phase differential image may also be treated as the two-dimensional phase image.

Figure 11:
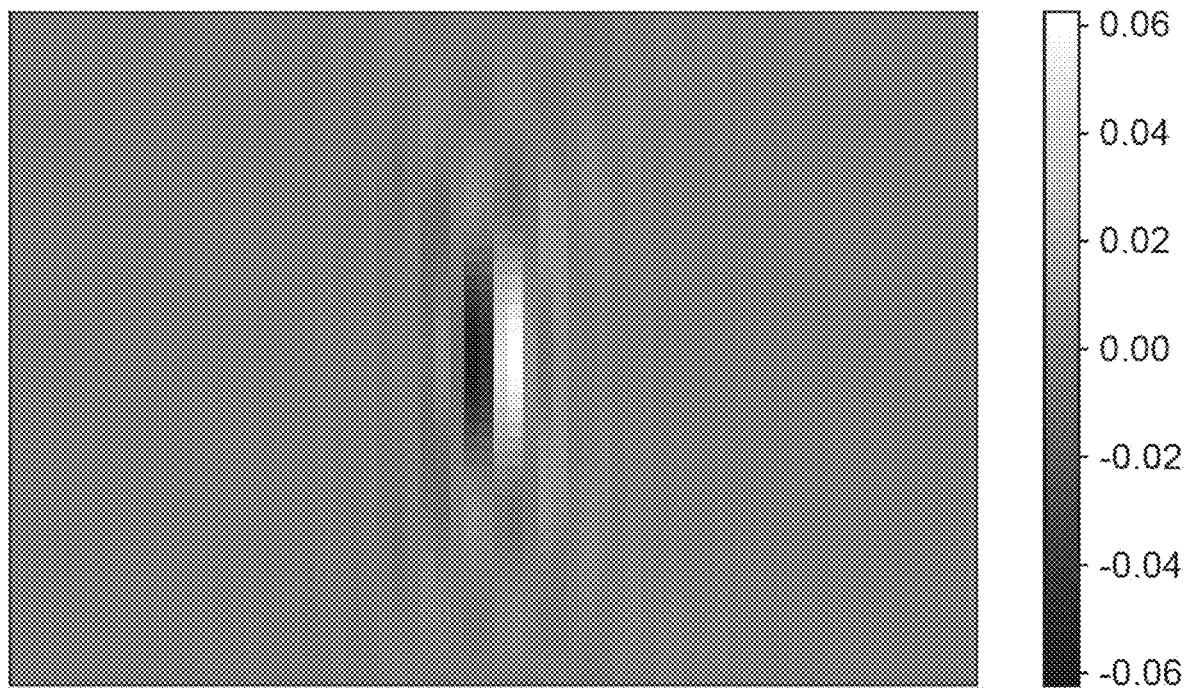
FIG. 11 is a diagram showing the kernel function.

In this case, the three-dimensional refractive index distribution of the observation object can be obtained from the phase differential image (two-dimensional phase image) generated in the step S22 by using the kernel (FIG. 11) including the kernel used in deconvolution of the step S23, in deconvolution of the refractive index distribution calculation step S76, without performing the step S23. The kernel shown in FIG. 11 is obtained by convolution integration of the kernel shown in FIG. 7 and the kernel used in deconvolution of the step S23.

Next, the details of the third complex amplitude image generation step S77 will be described. When acquiring the interference intensity image by irradiating the observation object with the light, in the j-th block, a light wavefront at the second position ($z=z_j$) propagates inside the j-th block to reach the first position ($z=z_{j-1}$) and further propagates to the imaging unit. Therefore, in the third complex amplitude image generation step S77, the light wavefront at the first position ($z=z_{j-1}$) is reversely propagated inside the j-th block by numerical calculation in consideration of the refractive index distribution of the j-th block, thereby obtaining the light wavefront at the second position ($z=z_j$).

That is, in the third complex amplitude image generation step S77, for each of the plurality of light irradiation directions, the complex amplitude image at the second position ($z=z_j$) of the j-th block is generated based on the complex amplitude image at the first position ($z=z_{j-1}$) of the j-th block and the refractive index distribution of the j-th block. In the above processing, a method of numerically calculating the propagation of the light wavefront in consideration of the refractive index distribution of the medium is used. A beam propagation method (BPM), a split-step non-paraxial (SSNP), and the like are known as the numerical calculation method of the inhomogeneous medium propagation described above. Hereinafter, the processing using the BPM in the third complex amplitude image generation step S77 will be described.

Figure 12:
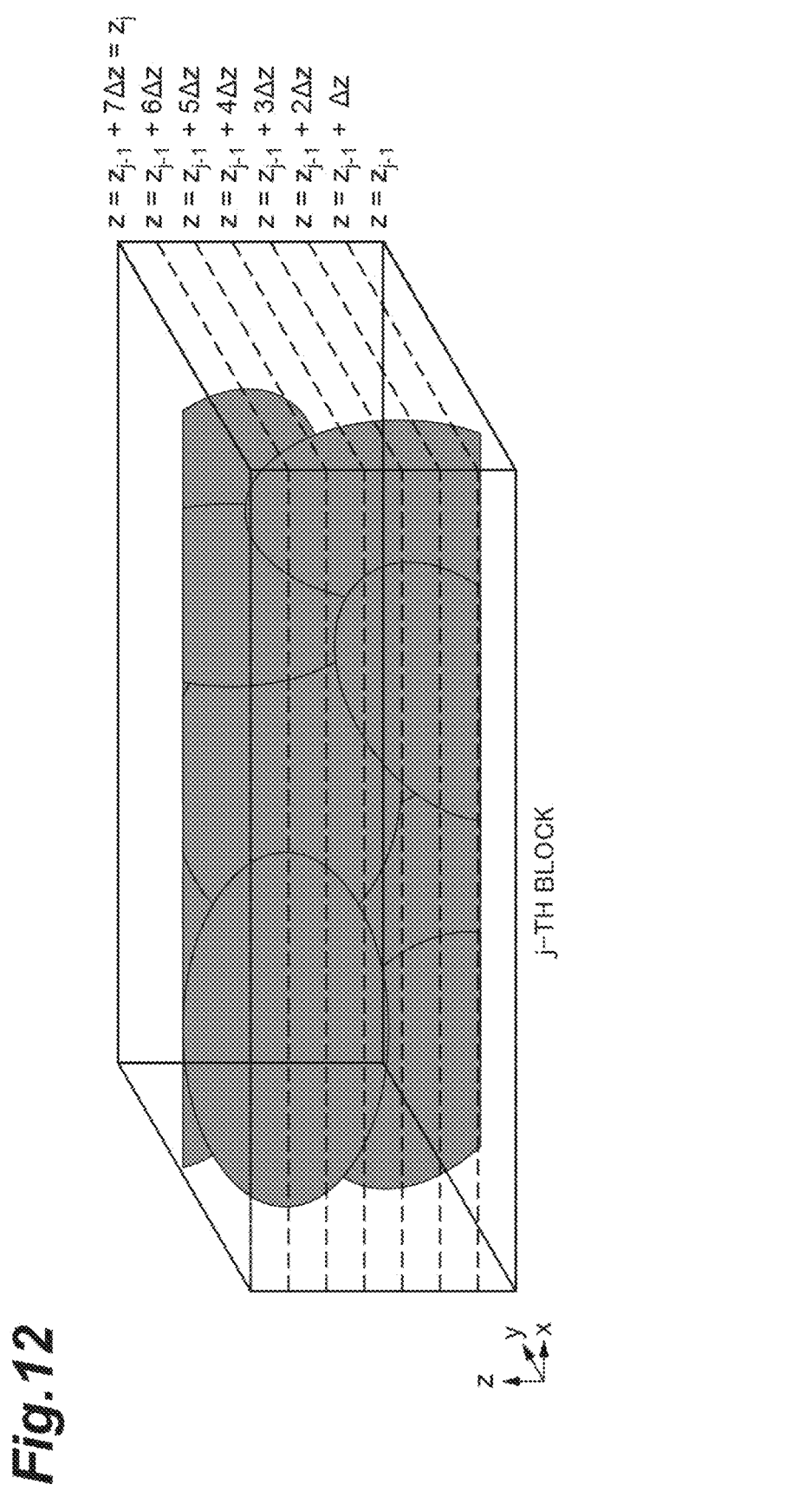
FIG. 12 is a diagram illustrating processing contents of a BPM.

FIG. 12 is a diagram illustrating processing contents of the BPM. This diagram illustrates an arbitrary j-th block. As illustrated in this diagram, the j-th block is divided into M slices (7 slices in this diagram) (first to M-th slices) based on the distance from the imaging unit along the light propagation path (z direction). A thickness of each slice is about a wavelength.

The thickness of each slice may be constant. In this case, it is assumed that the thickness of each slice is a constant value of $\Delta z$. The m-th slice out of the first to M-th slices of the j-th block is from a position $(z_{j-1}+(m-1)\Delta z)$ to a position $(z_{j-1}+m\Delta z)$. In order from the first position $(z=z_{j-1})$ of the j-th block to the second position $(z=z_j)$, a phase change according to the refractive index distribution is sequentially applied in each of the first to M-th slices, and the light wavefront is reversely propagated by $\Delta z$.

In addition, the thickness $\Delta z$ of each slice in the processing of the third complex amplitude image generation step S77 may be different from or may coincide with the position interval when generating the complex amplitude image of each of the plurality of z direction positions from the first position to the second position in the processing of the second complex amplitude image generation step S73.

The phase change $o(x, y, z)$ applied to the light wavefront when reversely propagating the slice of the thickness $\Delta z$ at the position z is represented by the following Formula (8). In the Formula (8), $k_v$ is a wavenumber of the light in vacuum. $\delta n(x, y, z)$ is a difference between the refractive index distribution n (x, y, z) of the observation object at the position z and the refractive index np of the background (medium), and is represented by the following Formula (9). Further, $\cos \theta$ is represented by the following Formula (10).

[Formula 8]

$$o(x, y, z) = \exp\left(-ik_v \delta n(x, y, z) \frac{\Delta z}{\cos\theta}\right) \quad (8)$$

[Formula 9]

$$\delta n(x, y, z) = n(z, y, z) - n_b \quad (9)$$

[Formula 10]

$$\cos\theta = \frac{\sqrt{n_b^2 k_v^2 - k_x^2 - k_y^2}}{n_b k_v} \quad (10)$$

Assuming that the complex amplitude of the light at the position $(z=z_{j-1}+(m-1)\Delta z)$ of the m-th slice is $u(x, y, z)$, the complex amplitude $u(x, y, z+\Delta z)$ of the light at the position $(z+\Delta z)$ after the light reversely propagates inside the m-th slice is represented by the following Formula (11). In the Formula (11), $P(k_x, k_y; \Delta z)$ is represented by the following Formula (12). The Formula (11) indicates that the complex amplitude $u(x, y, z+\Delta z)$ of the light at the position $(z+\Delta z)$ after propagating the slice of the thickness $\Delta z$ is obtained by performing Fourier transform on a product of the complex amplitude $u(x, y, z)$ of the light and the phase change $o(x, y, z)$, and performing inverse Fourier transform on a product of a result of the above Fourier transform and $P(k_x, k_y; \Delta z)$. $P_{\Delta z}$ is a function for performing calculation of the light propagation of $\Delta z$.

[Formula 11]

$$u(x, y, z + \Delta z) = P_{\Delta z}[o(x, y, z) \cdot u(x, y, z)] \quad (11)$$

$$\equiv F^{-1}[P(k_x, k_y; \Delta z) \cdot F[o(x, y, z) \cdot u(x, y, z)]]$$

[Formula 12]

$$P(k_x, k_y; \Delta z) = \exp\left(-i\sqrt{n_b^2 k_v^2 - k_x^2 - k_y^2}\,\Delta z\right) \quad (12)$$

The propagation of the light wavefront in each slice of the j-th block is represented by the following Formulas (13) to (15). That is, when the complex amplitude of the light at the first position $(z=z_{j-1})$ of the j-th block is set to $u(x, y, z_{j-1})$, the complex amplitude $u(x, y, z_{j-1}+\Delta z)$ of the light after propagating the first slice of the j-th block is represented by the following Formula (13). When the complex amplitude of the light after propagating the (m−1)-th slice of the j-th block is set to $u(x, y, z_{j-1}+(m-1)\Delta z)$, the complex amplitude $u(x, y, z_{j-1}+m\Delta z)$ of the light after propagating the m-th slice of the j-th block is represented by the following Formula (14). When the complex amplitude of the light after propagating the (M−1)-th slice of the j-th block is set to $u(x, y, z_{j-1}+(M-1)\Delta z)$, the complex amplitude $u(x, y, z_j)$ of the light at the second position $(z=z_j)$ after propagating the M-th slice of the j-th block is represented by the following Formula (15).

[Formula 13]

$$u(x, y, z_{j-1} + \Delta z) = P_{\Delta z}[o(x, y, z_{j-1}) \cdot u(x, y, z_{j-1})] \quad (13)$$

[Formula 14]

$$u(x, y, z_{j-1} + m\Delta z) = \quad (14)$$

$$P_{\Delta z}[o(x, y, z_{j-1} + (m-1)\Delta z) \cdot u(x, y, z_{j-1} + (m-1)\Delta z)]$$

[Formula 15]

$$u(x, y, z_j) = P_{\Delta z}[o(x, y, z_{j-1} + (M-1)\Delta z) \cdot u(x, y, z_{j-1} + (M-1)\Delta z)] \quad (15)$$

As described above, in the third complex amplitude image generation step S77, the light wavefront at the first position $(z=z_{j-1})$ is sequentially and reversely propagated inside the j-th block for each slice by the numerical calculation in consideration of the refractive index distribution of the j-th block, and thus, the light wavefront at the second position $(z=z_j)$ can be obtained.

Figure 13:
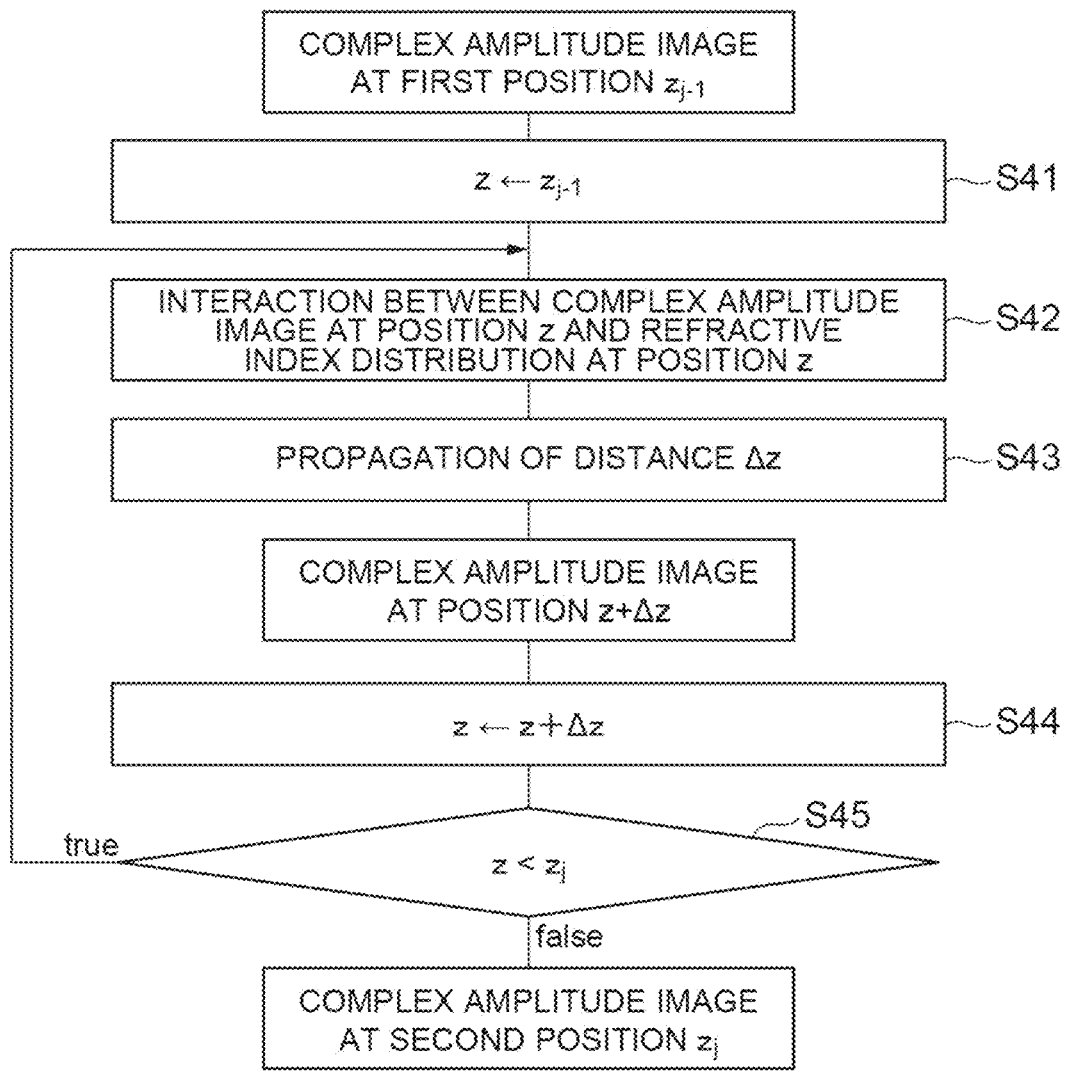
FIG. 13 is a flowchart of a third complex amplitude image generation step S77.

FIG. 13 is a flowchart of the third complex amplitude image generation step S77. In a step S41, the position z is initialized to the first position $(z=z_{j-1})$ of the j-th block. In a step S42, interaction between the complex amplitude $u(x, y, z)$ of the light at the position z and the phase change $o(x, y, z)$ is obtained. In a step S43, the wavefront of the light after the interaction is propagated by the distance $\Delta z$, and the complex amplitude $u(x, y, z+\Delta z)$ of the light at the position $z+\Delta z$ is obtained.

In a step S44, z obtained by adding $\Delta z$ is set as new z. In a step S45, when it is determined that the position z has not yet reached the second position $(z=z_j)$ of the j-th block, the process returns to the step S42 to repeat the steps S42 to S44. In the step S45, when it is determined that the position z reaches the second position $(z=z_j)$ of the j-th block, the processing of the third complex amplitude image generation step S77 is ended. The complex amplitude of the light acquired at the end becomes the complex amplitude at the second position $(z=z_j)$ of the j-th block.

Next, an example will be described. In this example, the observation apparatus 1A (FIG. 1) was used, and the Fourier fringe analysis method was adopted. In the step S21, the complex differential interference image was generated for each of the two different shear directions (vertical direction shear and horizontal direction shear) on the complex amplitude image. A spheroid of a three-dimensional culture of the human liver cancer-derived HepG2 was used as the observation object. The region including the observation object is divided into the five blocks. FIG. 14 to FIG. 28 are diagrams showing examples of images obtained in the respective steps.

Figure 14:
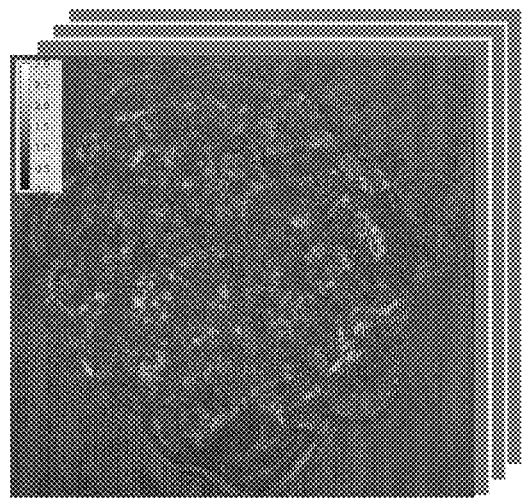
FIG. 14 is an interference intensity image (with vertical irradiation) acquired in the interference intensity image acquisition step S71.
Figure 14:
Figure 15:
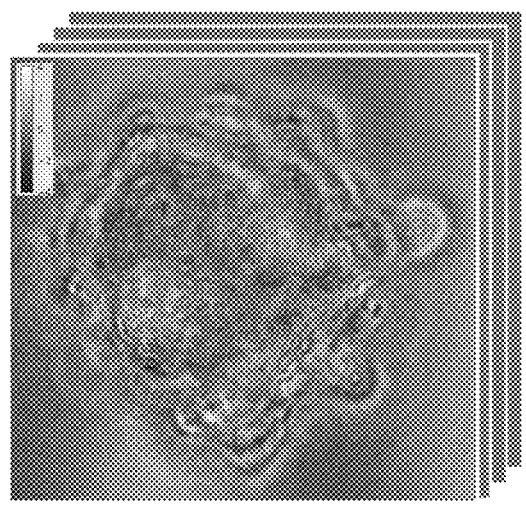
FIG. 15 is a complex amplitude image (real part, $z=z_0$) generated based on the interference intensity image (FIG. 14) in a first complex amplitude image generation step S72.
Figure 15:
Figure 16:
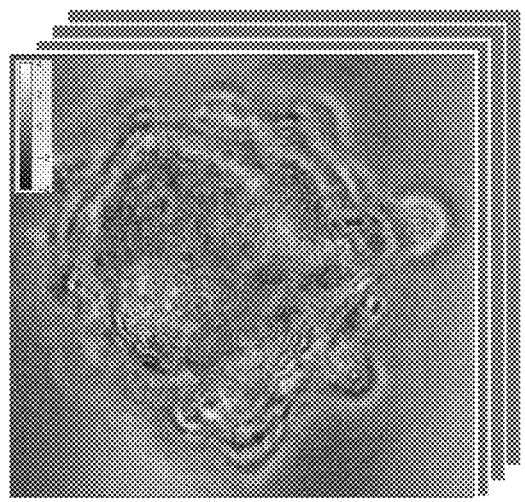
FIG. 16 is a complex amplitude image (real part, $z=z_n$) generated based on the complex amplitude image (FIG. 15) in a second complex amplitude image generation step S73.
Figure 16:

FIG. 14 is the interference intensity image (with vertical irradiation) acquired in the interference intensity image acquisition step S71. FIG. 15 is the complex amplitude image (real part, $z=z_0$) generated based on the interference intensity image (FIG. 14) in the first complex amplitude image generation step S72. FIG. 16 is the complex amplitude image (real part, $z=z_n$) generated based on the complex amplitude image (FIG. 15) in the second complex amplitude image generation step S73.

Figure 17:
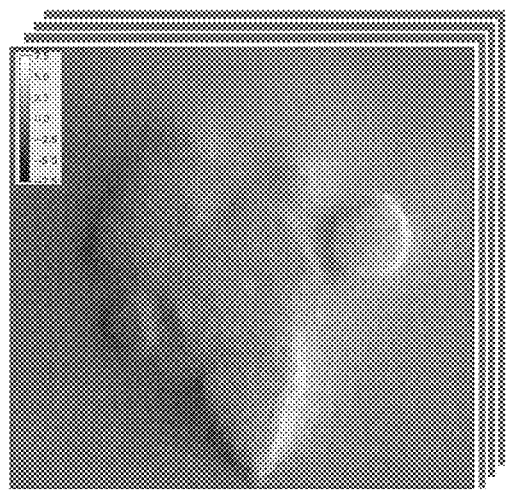
FIG. 17 includes complex differential interference images (imaginary parts respectively for x direction shear and y direction shear) generated based on the complex amplitude image (FIG. 16) in a step S21 in the two-dimensional phase image generation step S74.
Figure 17:
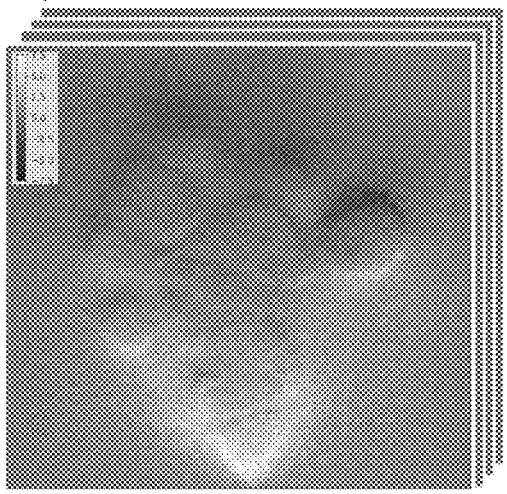
Figure 18:
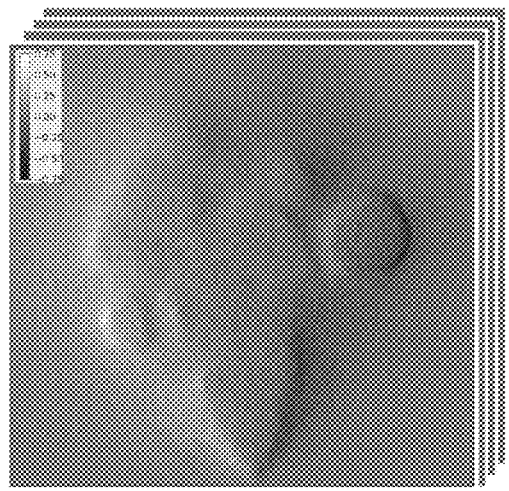
FIG. 18 includes phase differential images (x direction shear and y direction shear) generated based on the complex differential interference images (FIG. 17) in a step S22 in the two-dimensional phase image generation step S74.
Figure 18:
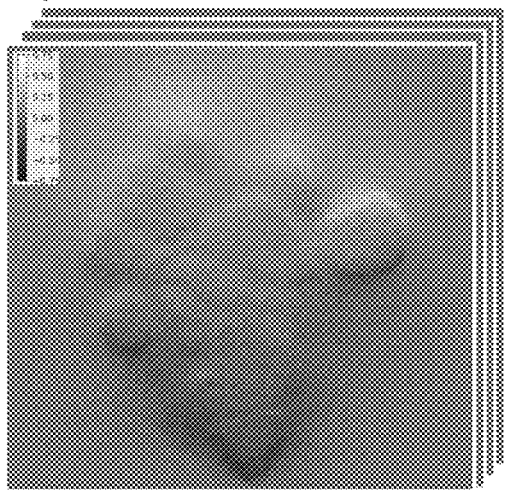
Figure 19:
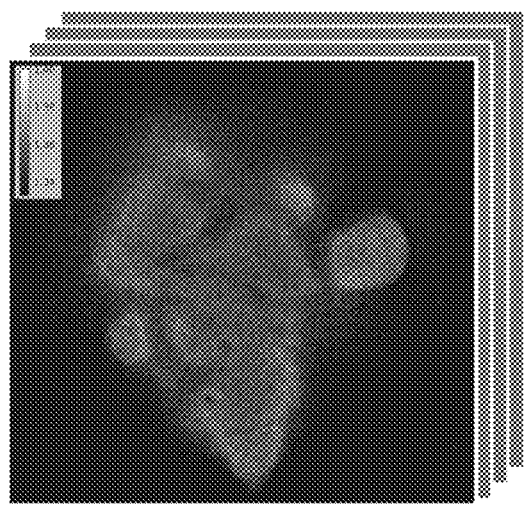
FIG. 19 is a refractive index distribution of a first block generated based on the phase differential images (FIG. 18) in a refractive index distribution calculation step S76.
Figure 19:

FIG. 17 includes the complex differential interference images (imaginary parts respectively for x direction shear and y direction shear) generated based on the complex amplitude image (FIG. 16) in the step S21 in the two-dimensional phase image generation step S74. FIG. 18 includes the phase differential images (x direction shear and y direction shear) generated based on the complex differential interference images (FIG. 17) in the step S22 in the two-dimensional phase image generation step S74. FIG. 19 is the refractive index distribution of the first block generated based on the phase differential images (FIG. 18) in the refractive index distribution calculation step S76.

Figure 20:
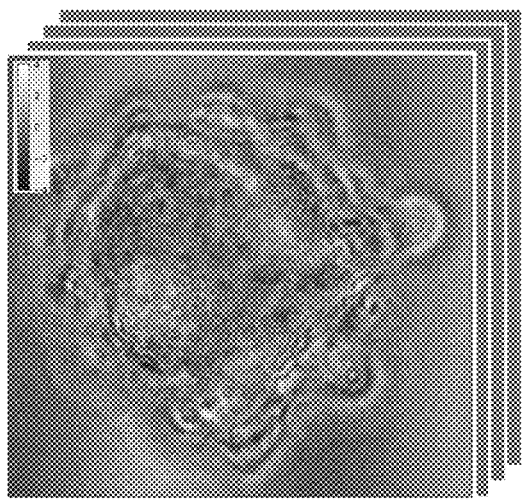
FIG. 20 is a complex amplitude image after applying a phase change o(x, y, z) to the complex amplitude image (FIG. 15) in a step S42 of a third complex amplitude image generation step S77.
Figure 21:
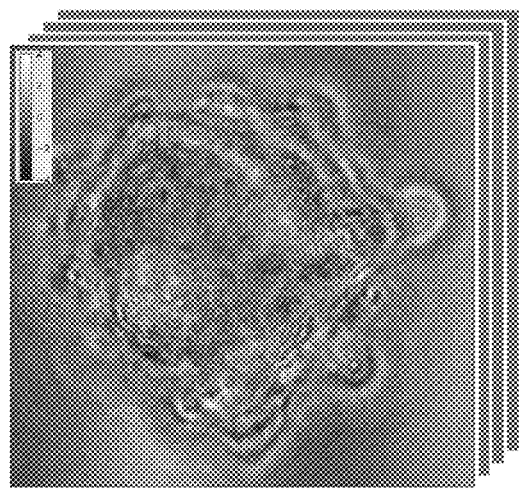
FIG. 21 is a complex amplitude image after propagating the complex amplitude image (FIG. 20) by $\Delta z$ in a step S43 of the third complex amplitude image generation step S77.
Figure 22:
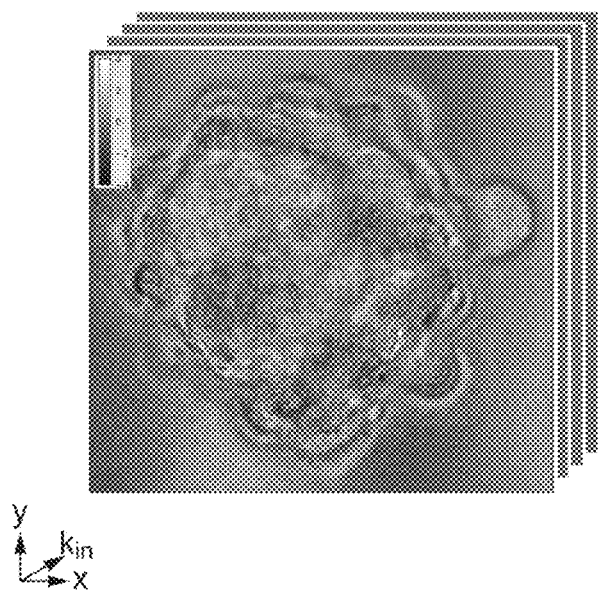
FIG. 22 is a complex amplitude image at a second position of the first block generated in the third complex amplitude image generation step S77.

FIG. 20 is the complex amplitude image after applying the phase change o(x, y, z) to the complex amplitude image (FIG. 15) in the step S42 of the third complex amplitude image generation step S77. FIG. 21 is the complex amplitude image after propagating the complex amplitude image (FIG. 20) by $\Delta z$ in the step S43 of the third complex amplitude image generation step S77. FIG. 22 is the complex amplitude image at the second position of the first block generated in the third complex amplitude image generation step S77.

FIG. 16 to FIG. 22 described above are examples of the images acquired in the respective steps for the first block. The processing as described above was performed similarly for the second to fifth blocks. The refractive index distribution is calculated for the last fifth block in the refractive index distribution calculation step S76, and then, the refractive index distributions of the first to fifth blocks are combined to obtain the three-dimensional refractive index distribution of the entire observation object.

Figure 23:
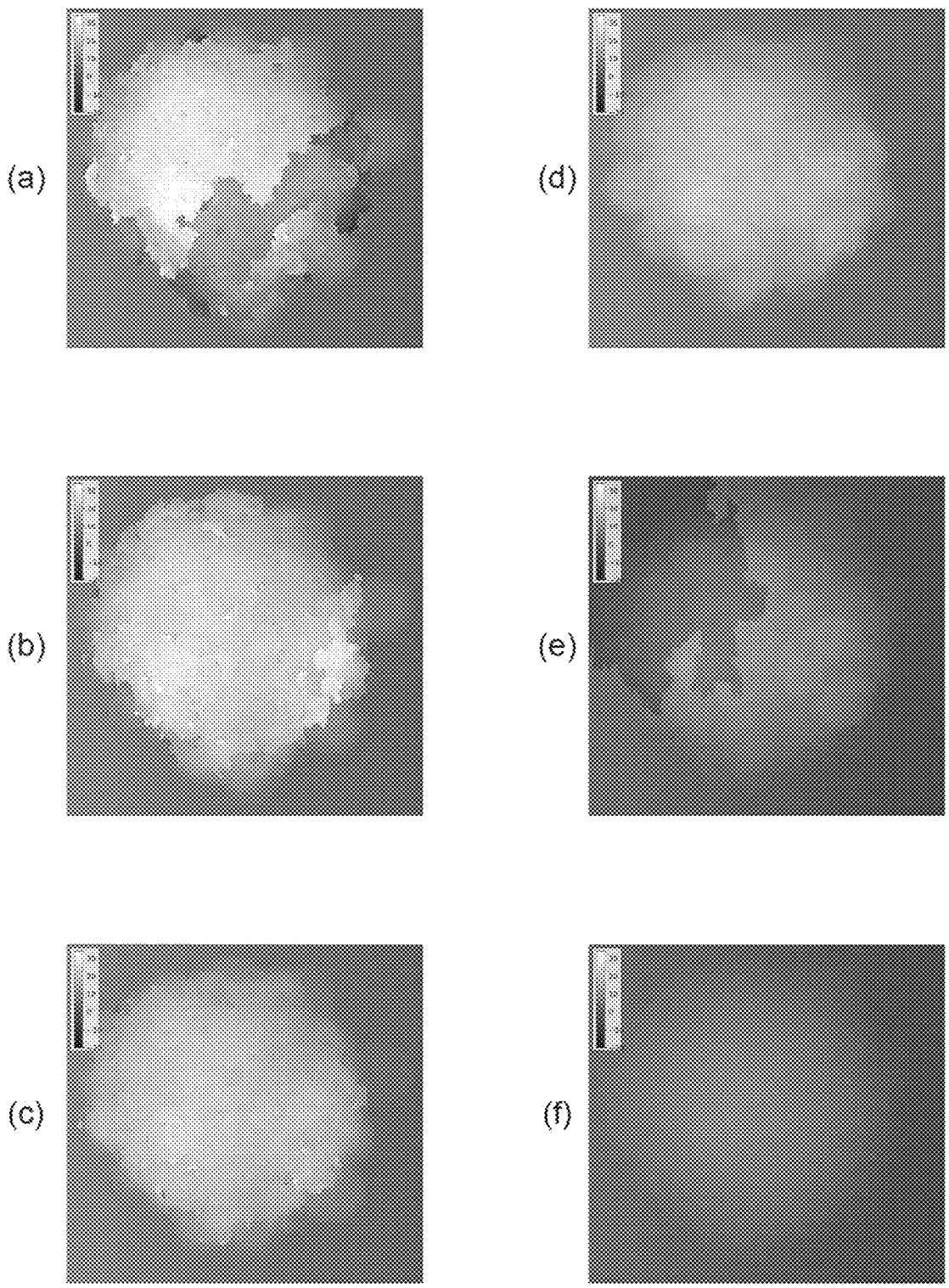
FIG. 23 includes (a) a diagram showing a phase distribution of a light wavefront at a first position ($z=z_0$) of a first block, (b) a diagram showing a phase distribution of a light wavefront at a second position ($z=z_1$) of the first block, (c) a diagram showing a phase distribution of a light wavefront at a second position ($z=z_2$) of a second block, (d) a diagram showing a phase distribution of a light wavefront at a second position ($z=z_3$) of a third block, (e) a diagram showing a phase distribution of a light wavefront at a second position ($z=z_4$) of a fourth block, and (f) a diagram showing a phase distribution of a light wavefront at a second position ($z=z_5$) of a fifth block.

(a) in FIG. 23 is a diagram showing the phase distribution of the light wavefront at the first position ($z=z_0$) of the first block. (b) in FIG. 23 is a diagram showing the phase distribution of the light wavefront at the second position ($z=z_1$) of the first block. (c) in FIG. 23 is a diagram showing the phase distribution of the light wavefront at the second position ($z=z_2$) of the second block. (d) in FIG. 23 is a diagram showing the phase distribution of the light wavefront at the second position ($z=z_3$) of the third block. (e) in FIG. 23 is a diagram showing the phase distribution of the light wavefront at the second position ($z=z_4$) of the fourth block. (f) in FIG. 23 is a diagram showing the phase distribution of the light wavefront at the second position ($z=z_5$) of the fifth block.

The above diagrams show the phase distribution of the light wavefront at each of the positions $z_0$ to $z_5$ when the light with which the observation object is perpendicularly irradiated is reversely propagated from the position $z_0$ to the position $z_5$. As shown in these diagrams, the phase distribution of the light wavefront is made uniform by reversely propagating the light sequentially in the first to fifth blocks.

FIG. 24 to FIG. 28 are diagrams showing the refractive index distributions of an example and a comparative example in comparison with each other. In the comparative example, without dividing the observation object into the plurality of blocks, the interference intensity image acquisition step S71, the first complex amplitude image generation step S72, the second complex amplitude image generation step S73, the two-dimensional phase image generation step S74, the three-dimensional phase image generation step S75, and the refractive index distribution calculation step S76 were sequentially performed to obtain the refractive index distribution of the observation object.

Figure 24:
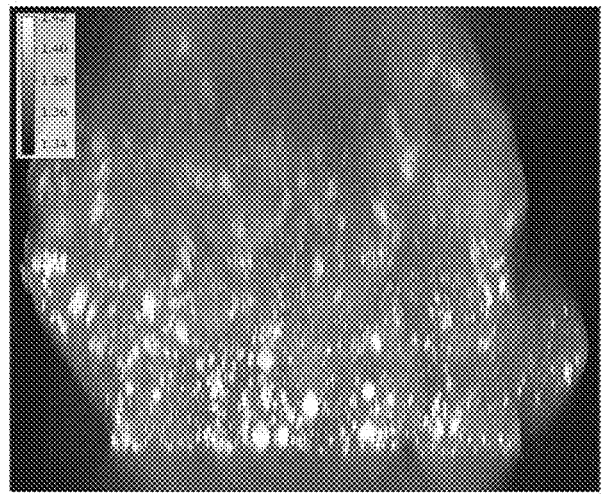
FIG. 24 includes (a) an MIP image in the y direction of a refractive index distribution obtained in a comparative example, and (b) an MIP image in the y direction of a refractive index distribution obtained in an example.
Figure 24:
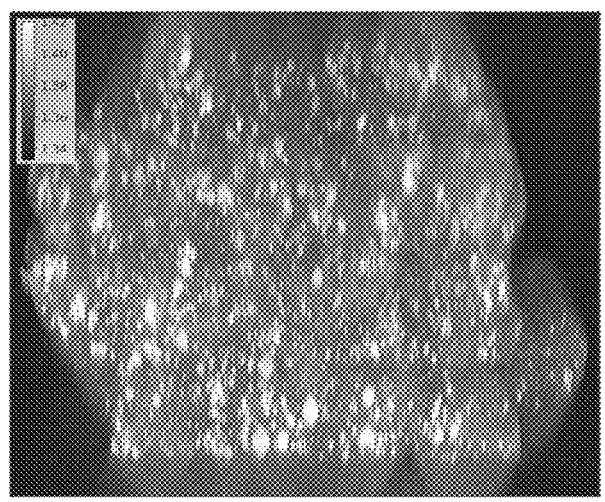
Figure 25:
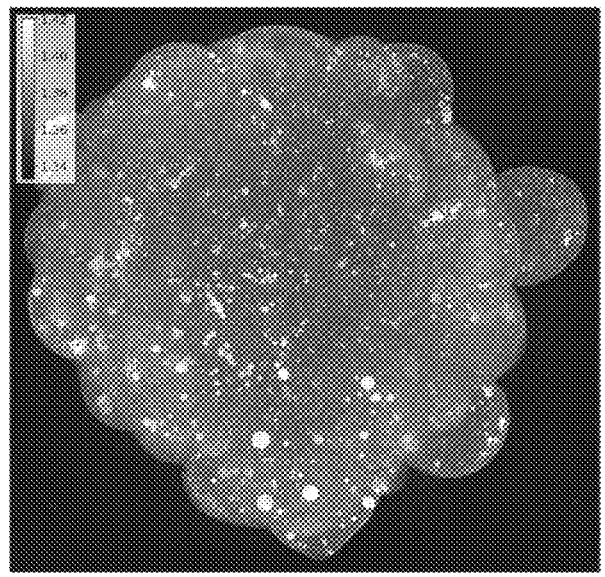
FIG. 25 includes (a) an MIP image in the z direction of the refractive index distribution obtained in the comparative example, and (b) an MIP image in the z direction of the refractive index distribution obtained in the example.
Figure 25:
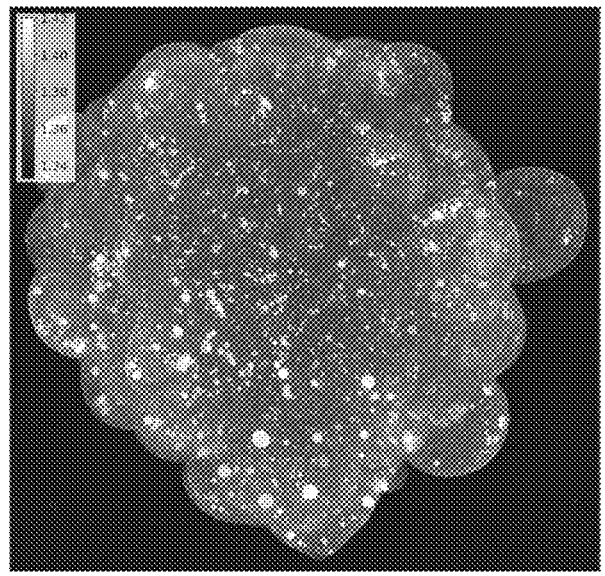

(a) in FIG. 24 is an MIP image in the y direction of the refractive index distribution obtained in the comparative example. (b) in FIG. 24 is an MIP image in the y direction of the refractive index distribution obtained in the example. (a) in FIG. 25 is an MIP image in the z direction of the refractive index distribution obtained in the comparative example. (b) in FIG. 25 is an MIP image in the z direction of the refractive index distribution obtained in the example. These MIP (maximum intensity projection) images are images obtained by performing processing that takes the maximum value of the refractive index along the y direction or the z direction in the refractive index distribution.

Figure 26:
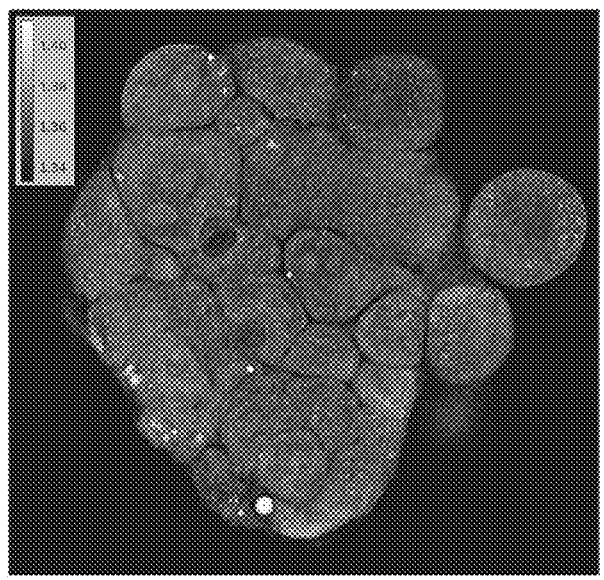
FIG. 26 includes (a) an image of the refractive index distribution ($z=22$ µm) obtained in the comparative example, and (b) an image of the refractive index distribution ($z=22$ µm) obtained in the example.
Figure 26:
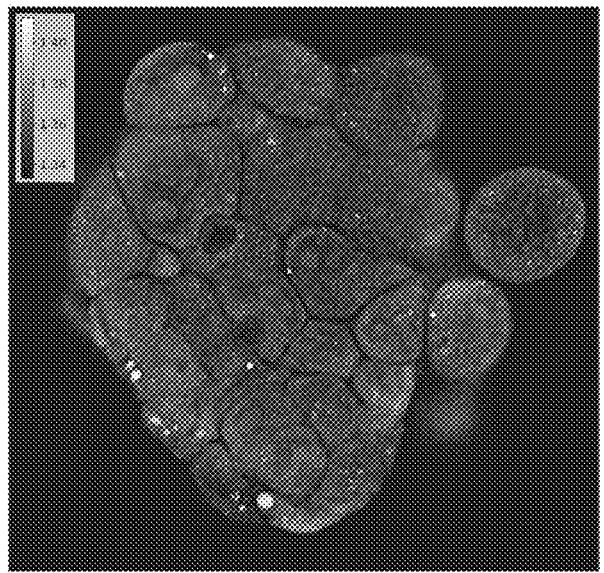
Figure 27:
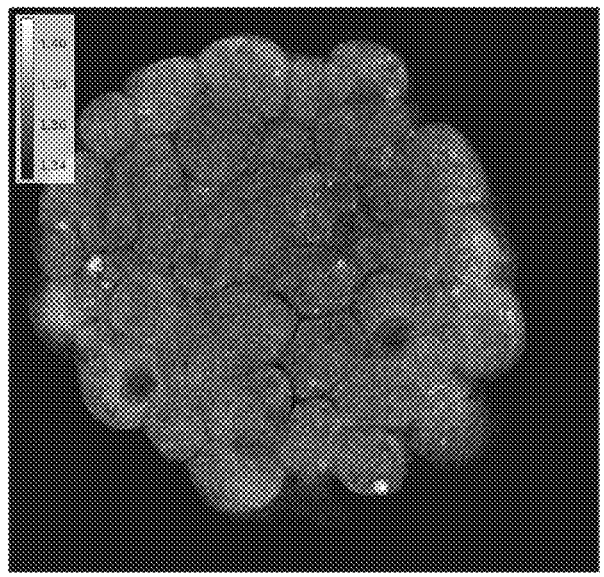
FIG. 27 includes (a) an image of the refractive index distribution ($z=45.2$ µm) obtained in the comparative example, and (b) an image of the refractive index distribution ($z=45.2$ µm) obtained in the example.
Figure 27:
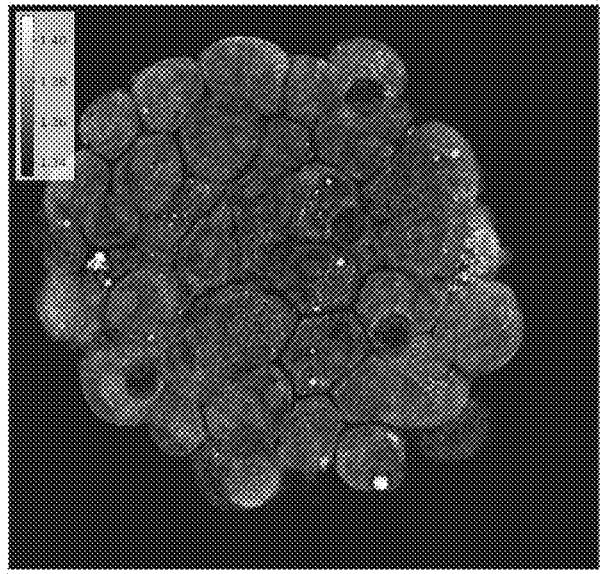
Figure 28:
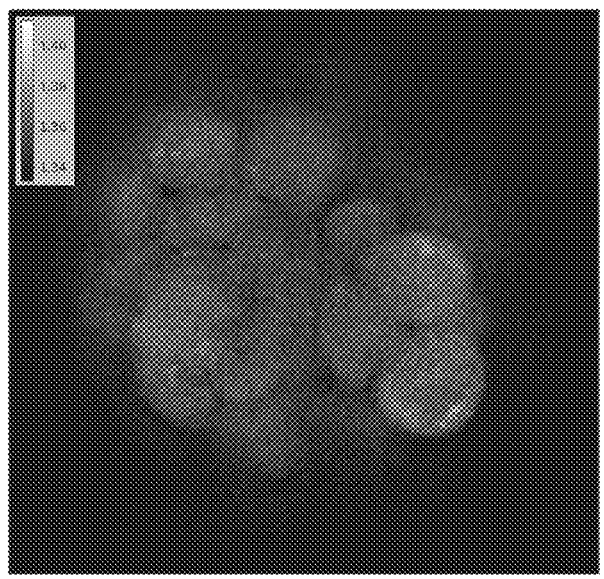
FIG. 28 includes (a) an image of the refractive index distribution ($z=68.8$ µm) obtained in the comparative example, and (b) an image of the refractive index distribution ($z=68.8$ µm) obtained in the example.
Figure 28:
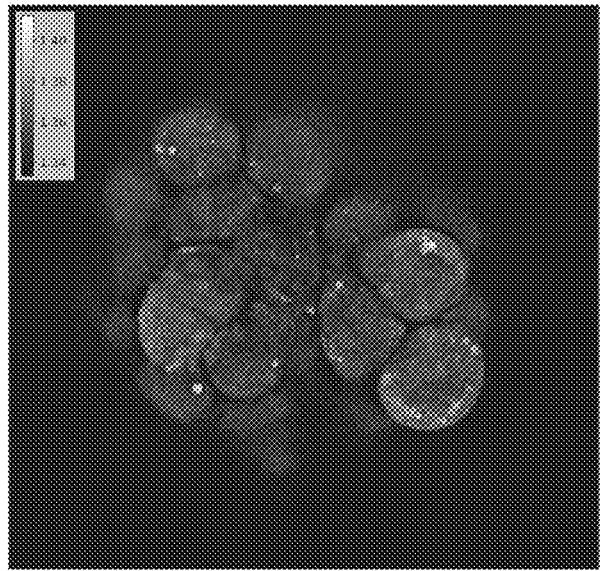

(a) in FIG. 26 is an image of the refractive index distribution (z=22 μm) obtained in the comparative example. (b) in FIG. 26 is an image of the refractive index distribution (z=22 μm) obtained in the example. (a) in FIG. 27 is an image of the refractive index distribution (z=45.2 μm) obtained in the comparative example. (b) in FIG. 27 is an image of the refractive index distribution (z=45.2 μm) obtained in the example. (a) in FIG. 28 is an image of the refractive index distribution (z=68.8 μm) obtained in the comparative example. (b) in FIG. 28 is an image of the refractive index distribution (z=68.8 μm) obtained in the example.

As can be seen from FIG. 24 to FIG. 28, in the refractive index distribution obtained in the comparative example, a structure disappears at a position far from the imaging unit. On the other hand, in the refractive index distribution obtained in the example, a structure can be confirmed even at a position far from the imaging unit.

Figure 29:
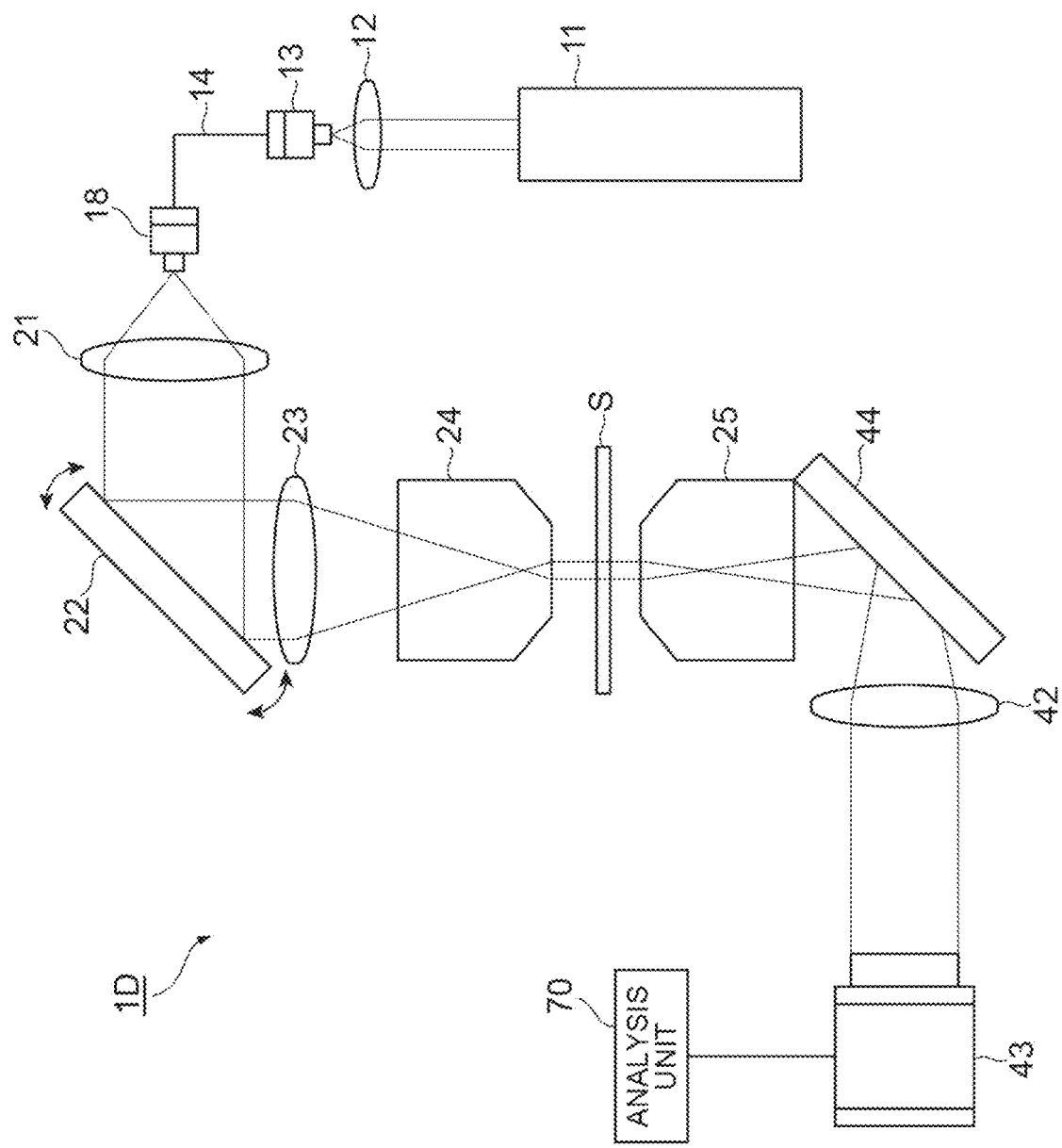
FIG. 29 is a diagram illustrating a configuration of an observation apparatus 1D.

In addition, self-interference may be used in the observation apparatus and the observation method. For example, an observation apparatus 1D illustrated in FIG. 29 includes the light source 11, the lens 12, the lens 21, the mirror 22, the lens 23, the condenser lens 24, the objective lens 25, a mirror 44, the lens 42, the imaging unit 43, and the analysis unit 70. Compared with the configuration of the observation apparatus described above, the observation apparatus 1D is different in that the light output from the light source 11 is guided by the optical fiber 14, and then output from the light output end 18 without being split into two light beams. Further, The observation apparatus 1D is different in that the mirror 44 is provided instead of the beam splitter 41.

The observation apparatus 1D does not include an interference optical system. The imaging unit 43 can image the interference intensity image at the reference position generated by self-interference of the light irradiating the observation object S along each of the plurality of light irradiation directions and passed through the observation object S. The analysis unit 70 can perform image processing similar to that of the observation apparatuses 1A to 1C using the interference intensity image generated by the self-interference described above.

Further, the three-dimensional refractive index distribution of the observation object S from the first position to the second position may not be the refractive index distribution based on the three-dimensional phase image, and may be acquired separately by using a refractive index distribution acquisition apparatus capable of acquiring the refractive index distribution.

In this case, the observation apparatus may include (1) an interference intensity image acquisition unit for acquiring, for each of a plurality of light irradiation directions, an interference intensity image at a reference position from an imaging unit for imaging the interference intensity image at the reference position of light irradiating an observation object along each of the plurality of light irradiation directions and passed through the observation object, (2) a first complex amplitude image generation unit for generating, for each of the plurality of light irradiation directions, a complex amplitude image based on the interference intensity image, (3) a refractive index distribution acquisition unit for acquiring a three-dimensional refractive index distribution of the observation object between a first position and a second position with respect to a distance from the imaging unit along a light propagation path, and (4) a second complex amplitude image generation unit for generating, for each of the plurality of light irradiation directions, a complex amplitude image at the second position based on a complex amplitude image at the first position and the three-dimensional refractive index distribution (corresponding to the third complex amplitude image generation unit provided in the observation apparatuses 1A to 1D).

Further, in this case, the observation method may include (1) an interference intensity image acquisition step of acquiring, for each of a plurality of light irradiation directions, an interference intensity image at a reference position from an imaging unit for imaging the interference intensity image at the reference position of light irradiating an observation object along each of the plurality of light irradiation directions and passed through the observation object, (2) a first complex amplitude image generation step of generating, for each of the plurality of light irradiation directions, a complex amplitude image based on the interference intensity image, (3) a refractive index distribution acquisition step of acquiring a three-dimensional refractive index distribution of the observation object between a first position and a second position with respect to a distance from the imaging unit along a light propagation path, and (4) a second complex amplitude image generation step of generating, for each of the plurality of light irradiation directions, a complex amplitude image at the second position based on a complex amplitude image at the first position and the three-dimensional refractive index distribution (corresponding to the third complex amplitude image generation step provided in the observation methods by using the observation apparatuses 1A to 1D).

As described above, in the present embodiment, even when the observation object is the multiple scattering object, it is possible to observe the observation object while reducing the influence of the multiple scattered light, and it is possible to improve the degree of depth in the observation of the observation object.

The observation apparatus and the observation method are not limited to the embodiments and configuration examples described above, and various modifications are possible.

The observation apparatus of the above embodiment includes (1) an interference intensity image acquisition unit for acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation unit for generating, for each of the plurality of light irradiation directions, a complex amplitude image based on the interference intensity image; (3) a second complex amplitude image generation unit for generating, for each of the plurality of light irradiation directions, a complex amplitude image at each of a plurality of positions between a first position and a second position based on a complex amplitude image at the first position with respect to a distance from the imaging unit along a light propagation path; (4) a two-dimensional phase image generation unit for generating, for each of the plurality of positions, a complex differential interference image of each of the plurality of light irradiation directions based on the complex amplitude image of each of the plurality of light irradiation directions, and generating a two-dimensional phase image based on the complex differential interference image of each of the plurality of light irradiation directions; (5) a three-dimensional phase image generation unit for generating a three-dimensional phase image between the first position and the second position based on the two-dimensional phase image at each of the plurality of positions; (6) a refractive index distribution calculation unit for obtaining a three-dimensional refractive index distribution of the observation object between the first position and the second position based on the three-dimensional phase image; and (7) a third complex amplitude image generation unit for generating, for each of the plurality of light irradiation directions, a complex amplitude image at the second position based on the complex amplitude image at the first position and the three-dimensional refractive index distribution, and based on the complex amplitude image generated by the first complex amplitude image generation unit, respective processing steps of the second complex amplitude image generation unit, the two-dimensional phase image generation unit, the three-dimensional phase image generation unit, the refractive index distribution calculation unit, and the third complex amplitude image generation unit are sequentially performed.

In the above observation apparatus, (a) a region including the observation object may be divided into a first block and a second block in order based on the distance from the imaging unit along the light propagation path, (b) for the first block closest to the imaging unit, based on the complex amplitude image generated by the first complex amplitude image generation unit, a near end of the first block may be set as the first position, a far end of the first block may be set as the second position, and the respective processing steps of the second complex amplitude image generation unit, the two-dimensional phase image generation unit, the three-dimensional phase image generation unit, the refractive index distribution calculation unit, and the third complex amplitude image generation unit may be sequentially performed, and (c) for the second block being a last block farthest from the imaging unit, based on the complex amplitude image generated for the first block by the third complex amplitude image generation unit, a near end of the second block may be set as the first position, a far end of the second block may be set as the second position, and the respective processing steps of the second complex amplitude image generation unit, the two-dimensional phase image generation unit, and the three-dimensional phase image generation unit may be sequentially performed.

In the above observation apparatus, (a) a region including the observation object may be divided into first to J-th blocks (J is 3 or more) in order based on the distance from the imaging unit along the light propagation path, (b) for the first block closest to the imaging unit, based on the complex amplitude image generated by the first complex amplitude image generation unit, a near end of the first block may be set as the first position, a far end of the first block may be set as the second position, and the respective processing steps of the second complex amplitude image generation unit, the two-dimensional phase image generation unit, the three-dimensional phase image generation unit, the refractive index distribution calculation unit, and the third complex amplitude image generation unit may be sequentially performed, (c) for the j-th block (j is 2 or more and less than J), based on the complex amplitude image generated for the (j−1)-th block by the third complex amplitude image generation unit, a near end of the j-th block may be set as the first position, a far end of the j-th block may be set as the second position, and the respective processing steps of the second complex amplitude image generation unit, the two-dimensional phase image generation unit, the three-dimensional phase image generation unit, the refractive index distribution calculation unit, and the third complex amplitude image generation unit may be sequentially performed, and (d) for the J-th block being a last block farthest from the imaging unit, based on the complex amplitude image generated for the (J−1)-th block by the third complex amplitude image generation unit, a near end of the J-th block may be set as the first position, a far end of the J-th block may be set as the second position, and the respective processing steps of the second complex amplitude image generation unit, the two-dimensional phase image generation unit, and the three-dimensional phase image generation unit may be sequentially performed.

In the above observation apparatus, for the last block, the processing step of the refractive index distribution calculation unit may be performed after the processing step of the three-dimensional phase image generation unit.

In the above observation apparatus, the two-dimensional phase image generation unit may generate the complex differential interference image of each of the plurality of light irradiation directions for each of a plurality of shear directions on the image different from each other based on the complex amplitude image of each of the plurality of light irradiation directions, and may generate the two-dimensional phase image based on the complex differential interference image of each of the plurality of shear directions and the plurality of light irradiation directions.

In the above observation apparatus, the two-dimensional phase image generation unit may generate the two-dimensional phase image based on a summation of the complex differential interference images of the plurality of light irradiation directions.

The observation method of the above embodiment includes (1) an interference intensity image acquisition step of acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation step of generating, for each of the plurality of light irradiation directions, a complex amplitude image based on the interference intensity image; (3) a second complex amplitude image generation step of generating, for each of the plurality of light irradiation directions, a complex amplitude image at each of a plurality of positions between a first position and a second position based on a complex amplitude image at the first position with respect to a distance from the imaging unit along a light propagation path; (4) a two-dimensional phase image generation step of generating, for each of the plurality of positions, a complex differential interference image of each of the plurality of light irradiation directions based on the complex amplitude image of each of the plurality of light irradiation directions, and generating a two-dimensional phase image based on the complex differential interference image of each of the plurality of light irradiation directions; (5) a three-dimensional phase image generation step of generating a three-dimensional phase image between the first position and the second position based on the two-dimensional phase image at each of the plurality of positions; (6) a refractive index distribution calculation step of obtaining a three-dimensional refractive index distribution of the observation object between the first position and the second position based on the three-dimensional phase image; and (7) a third complex amplitude image generation step of generating, for each of the plurality of light irradiation directions, a complex amplitude image at the second position based on the complex amplitude image at the first position and the three-dimensional refractive index distribution, and based on the complex amplitude image generated in the first complex amplitude image generation step, respective processing steps of the second complex amplitude image generation step, the two-dimensional phase image generation step, the three-dimensional phase image generation step, the refractive index distribution calculation step, and the third complex amplitude image generation step are sequentially performed.

In the above observation method, (a) a region including the observation object may be divided into a first block and a second block in order based on the distance from the imaging unit along the light propagation path, (b) for the first block closest to the imaging unit, based on the complex amplitude image generated in the first complex amplitude image generation step, a near end of the first block may be set as the first position, a far end of the first block may be set as the second position, and the respective processing steps of the second complex amplitude image generation step, the two-dimensional phase image generation step, the three-dimensional phase image generation step, the refractive index distribution calculation step, and the third complex amplitude image generation step may be sequentially performed, and (c) for the second block being a last block farthest from the imaging unit, based on the complex amplitude image generated for the first block in the third complex amplitude image generation step, a near end of the second block may be set as the first position, a far end of the second block may be set as the second position, and the respective processing steps of the second complex amplitude image generation step, the two-dimensional phase image generation step, and the three-dimensional phase image generation step may be sequentially performed.

In the above observation method, (a) a region including the observation object may be divided into first to J-th blocks (J is 3 or more) in order based on the distance from the imaging unit along the light propagation path, (b) for the first block closest to the imaging unit, based on the complex amplitude image generated in the first complex amplitude image generation step, a near end of the first block may be set as the first position, a far end of the first block may be set as the second position, and the respective processing steps of the second complex amplitude image generation step, the two-dimensional phase image generation step, the three-dimensional phase image generation step, the refractive index distribution calculation step, and the third complex amplitude image generation step may be sequentially performed, (c) for the j-th block (j is 2 or more and less than J), based on the complex amplitude image generated for the (j−1)-th block in the third complex amplitude image generation step, a near end of the j-th block may be set as the first position, a far end of the j-th block may be set as the second position, and the respective processing steps of the second complex amplitude image generation step, the two-dimensional phase image generation step, the three-dimensional phase image generation step, the refractive index distribution calculation step, and the third complex amplitude image generation step may be sequentially performed, and (d) for the J-th block being a last block farthest from the imaging unit, based on the complex amplitude image generated for the (J−1)-th block in the third complex amplitude image generation step, a near end of the J-th block may be set as the first position, a far end of the J-th block may be set as the second position, and the respective processing steps of the second complex amplitude image generation step, the two-dimensional phase image generation step, and the three-dimensional phase image generation step may be sequentially performed.

In the above observation method, for the last block, the processing step of the refractive index distribution calculation step may be performed after the processing step of the three-dimensional phase image generation step.

In the above observation method, the two-dimensional phase image generation step may include generating the complex differential interference image of each of the plurality of light irradiation directions for each of a plurality of shear directions on the image different from each other based on the complex amplitude image of each of the plurality of light irradiation directions, and generating the two-dimensional phase image based on the complex differential interference image of each of the plurality of shear directions and the plurality of light irradiation directions.

In the above observation method, the two-dimensional phase image generation step may include generating the two-dimensional phase image based on a summation of the complex differential interference images of the plurality of light irradiation directions.

The program of the above embodiment is a program for causing a computer to execute the steps of the observation method of the above configuration.

The recording medium of the above embodiment is a computer readable recording medium recording the program of the above configuration.

INDUSTRIAL APPLICABILITY

The embodiments can be used as an observation apparatus and an observation method capable of observing an observation object while reducing influence of multiple scattered light even when the observation object is a multiple scattering object.

REFERENCE SIGNS LIST 1A-1C—observation apparatus, 2—recording medium, 11—light source, 12—lens, 13—light input end, 14—optical fiber, 15—fiber coupler, 16, 17—optical fiber, 18, 19—light output end, 21—lens, 22—mirror, 23—lens, 24—condenser lens, 25—objective lens, 31—lens, 32—mirror, 33—drive unit, 34—lens, 41—beam splitter, 42—lens, 43—imaging unit, 44—mirror, 70—analysis unit, 71—interference intensity image acquisition unit, 72—first complex amplitude image generation unit, 73—second complex amplitude image generation unit, 74—two-dimensional phase image generation unit, 75—three-dimensional phase image generation unit, 76—refractive index distribution calculation unit, 77—third complex amplitude image generation unit, 78—display unit, 79—storage unit.

The invention claimed is:

1. An observation apparatus comprising:
an interference intensity image acquisition unit configured to acquire, for each of a plurality of light irradiation directions, an interference intensity image at a reference position from an imaging unit configured to image the interference intensity image at the reference position generated by interference between light irradiating an observation object along each of the plurality of light irradiation directions and passed through the observation object and reference light;
a first complex amplitude image generation unit configured to generate, for each of the plurality of light irradiation directions, a complex amplitude image based on the interference intensity image;
a second complex amplitude image generation unit configured to generate, for each of the plurality of light irradiation directions, a complex amplitude image at each of a plurality of positions between a first position and a second position based on a complex amplitude image at the first position with respect to a distance from the imaging unit along a light propagation path;
a two-dimensional phase image generation unit configured to generate, for each of the plurality of positions, a complex differential interference image of each of the plurality of light irradiation directions based on the complex amplitude image of each of the plurality of light irradiation directions, and generate a two-dimensional phase image based on the complex differential interference image of each of the plurality of light irradiation directions;
a three-dimensional phase image generation unit configured to generate a three-dimensional phase image between the first position and the second position based on the two-dimensional phase image at each of the plurality of positions;
a refractive index distribution calculation unit configured to obtain a three-dimensional refractive index distribution of the observation object between the first position and the second position based on the three-dimensional phase image; and
a third complex amplitude image generation unit configured to generate, for each of the plurality of light irradiation directions, a complex amplitude image at the second position based on the complex amplitude image at the first position and the three-dimensional refractive index distribution, wherein
based on the complex amplitude image generated by the first complex amplitude image generation unit, respective processing steps of the second complex amplitude image generation unit, the two-dimensional phase image generation unit, the three-dimensional phase image generation unit, the refractive index distribution calculation unit, and the third complex amplitude image generation unit are sequentially performed.

2. The observation apparatus according to claim 1, wherein
a region including the observation object is divided into a first block and a second block in order based on the distance from the imaging unit along the light propagation path,
for the first block closest to the imaging unit, based on the complex amplitude image generated by the first complex amplitude image generation unit, a near end of the first block is set as the first position, a far end of the first block is set as the second position, and the respective processing steps of the second complex amplitude image generation unit, the two-dimensional phase image generation unit, the three-dimensional phase image generation unit, the refractive index distribution calculation unit, and the third complex amplitude image generation unit are sequentially performed, and for the second block being a last block farthest from the imaging unit, based on the complex amplitude image generated for the first block by the third complex amplitude image generation unit, a near end of the second block is set as the first position, a far end of the second block is set as the second position, and the respective processing steps of the second complex amplitude image generation unit, the two-dimensional phase image generation unit, and the three-dimensional phase image generation unit are sequentially performed.

3. The observation apparatus according to claim 1, wherein a region including the observation object is divided into first to J-th blocks (J is 3 or more) in order based on the distance from the imaging unit along the light propagation path, for the first block closest to the imaging unit, based on the complex amplitude image generated by the first complex amplitude image generation unit, a near end of the first block is set as the first position, a far end of the first block is set as the second position, and the respective processing steps of the second complex amplitude image generation unit, the two-dimensional phase image generation unit, the three-dimensional phase image generation unit, the refractive index distribution calculation unit, and the third complex amplitude image generation unit are sequentially performed, for the j-th block (j is 2 or more and less than J), based on the complex amplitude image generated for the (j−1)-th block by the third complex amplitude image generation unit, a near end of the j-th block is set as the first position, a far end of the j-th block is set as the second position, and the respective processing steps of the second complex amplitude image generation unit, the two-dimensional phase image generation unit, the three-dimensional phase image generation unit, the refractive index distribution calculation unit, and the third complex amplitude image generation unit are sequentially performed, and for the J-th block being a last block farthest from the imaging unit, based on the complex amplitude image generated for the (J−1)-th block by the third complex amplitude image generation unit, a near end of the J-th block is set as the first position, a far end of the J-th block is set as the second position, and the respective processing steps of the second complex amplitude image generation unit, the two-dimensional phase image generation unit, and the three-dimensional phase image generation unit are sequentially performed.

4. The observation apparatus according to claim 2, wherein, for the last block, the processing step of the refractive index distribution calculation unit is performed after the processing step of the three-dimensional phase image generation unit.

5. The observation apparatus according to claim 1, wherein the two-dimensional phase image generation unit is configured to generate the complex differential interference image of each of the plurality of light irradiation directions for each of a plurality of shear directions on the image different from each other based on the complex amplitude image of each of the plurality of light irradiation directions, and generate the two-dimensional phase image based on the complex differential interference image of each of the plurality of shear directions and the plurality of light irradiation directions.

6. The observation apparatus according to claim 1, wherein the two-dimensional phase image generation unit is configured to generate the two-dimensional phase image based on a summation of the complex differential interference images of the plurality of light irradiation directions.

7. An observation method comprising:

performing an interference intensity image acquisition of acquiring, for each of a plurality of light irradiation directions, an interference intensity image at a reference position from an imaging unit configured to image the interference intensity image at the reference position generated by interference between light irradiating an observation object along each of the plurality of light irradiation directions and passed through the observation object and reference light;

performing a first complex amplitude image generation of generating, for each of the plurality of light irradiation directions, a complex amplitude image based on the interference intensity image;

performing a second complex amplitude image generation of generating, for each of the plurality of light irradiation directions, a complex amplitude image at each of a plurality of positions between a first position and a second position based on a complex amplitude image at the first position with respect to a distance from the imaging unit along a light propagation path;

performing a two-dimensional phase image generation of generating, for each of the plurality of positions, a complex differential interference image of each of the plurality of light irradiation directions based on the complex amplitude image of each of the plurality of light irradiation directions, and generating a two-dimensional phase image based on the complex differential interference image of each of the plurality of light irradiation directions;

performing a three-dimensional phase image generation of generating a three-dimensional phase image between the first position and the second position based on the two-dimensional phase image at each of the plurality of positions;

performing a refractive index distribution calculation of obtaining a three-dimensional refractive index distribution of the observation object between the first position and the second position based on the three-dimensional phase image; and performing a third complex amplitude image generation of generating, for each of the plurality of light irradiation directions, a complex amplitude image at the second position based on the complex amplitude image at the first position and the three-dimensional refractive index distribution, wherein based on the complex amplitude image generated in the first complex amplitude image generation, respective processing steps of the second complex amplitude image generation, the two-dimensional phase image generation, the three-dimensional phase image generation, the refractive index distribution calculation, and the third complex amplitude image generation are sequentially performed.

8. The observation method according to claim 7, wherein
a region including the observation object is divided into a
   first block and a second block in order based on the
   distance from the imaging unit along the light propagation path,
for the first block closest to the imaging unit, based on the
   complex amplitude image generated in the first complex amplitude image generation, a near end of the first
   block is set as the first position, a far end of the first
   block is set as the second position, and the respective
   processing steps of the second complex amplitude
   image generation, the two-dimensional phase image
   generation, the three-dimensional phase image generation, the refractive index distribution calculation, and
   the third complex amplitude image generation are
   sequentially performed, and
for the second block being a last block farthest from the
   imaging unit, based on the complex amplitude image
   generated for the first block in the third complex
   amplitude image generation, a near end of the second
   block is set as the first position, a far end of the second
   block is set as the second position, and the respective
   processing steps of the second complex amplitude
   image generation, the two-dimensional phase image
   generation, and the three-dimensional phase image
   generation are sequentially performed.

9. The observation method according to claim 7, wherein
a region including the observation object is divided into
   first to J-th blocks (J is 3 or more) in order based on the
   distance from the imaging unit along the light propagation path,
for the first block closest to the imaging unit, based on the
   complex amplitude image generated in the first complex amplitude image generation, a near end of the first
   block is set as the first position, a far end of the first
   block is set as the second position, and the respective
   processing steps of the second complex amplitude
   image generation, the two-dimensional phase image
   generation, the three-dimensional phase image generation, the refractive index distribution calculation, and
   the third complex amplitude image generation are
   sequentially performed,
for the j-th block (j is 2 or more and less than J), based on
   the complex amplitude image generated for the (j−1)-th
   block in the third complex amplitude image generation,
   a near end of the j-th block is set as the first position,
   a far end of the j-th block is set as the second position,
   and the respective processing steps of the second
   complex amplitude image generation, the two-dimensional phase image generation, the three-dimensional
   phase image generation, the refractive index distribution calculation, and the third complex amplitude
   image generation are sequentially performed, and
for the J-th block being a last block farthest from the
   imaging unit, based on the complex amplitude image
   generated for the (J−1)-th block in the third complex
   amplitude image generation, a near end of the J-th
   block is set as the first position, a far end of the J-th
   block is set as the second position, and the respective
   processing steps of the second complex amplitude
   image generation, the two-dimensional phase image
   generation, and the three-dimensional phase image
   generation are sequentially performed.

10. The observation method according to claim 8, wherein, for the last block, the processing of the refractive index distribution calculation step is performed after the processing of the three-dimensional phase image generation step.

11. The observation method according to claim 7, wherein the two-dimensional phase image generation includes
   generating the complex differential interference image of
      each of the plurality of light irradiation directions for
      each of a plurality of shear directions on the image
      different from each other based on the complex amplitude image of each of the plurality of light irradiation
      directions, and
   generating the two-dimensional phase image based on the
      complex differential interference image of each of the
      plurality of shear directions and the plurality of light
      irradiation directions.

12. The observation method according to claim 7, wherein the two-dimensional phase image generation includes generating the two-dimensional phase image based on a summation of the complex differential interference images of the plurality of light irradiation directions.

13. A program for causing a computer to execute the processing steps of the observation method according to claim 7.

14. A computer readable recording medium recording the program according to claim 13.

15. The observation apparatus according to claim 3, wherein, for the last block, the processing step of the refractive index distribution calculation unit is performed after the processing step of the three-dimensional phase image generation unit.

16. The observation method according to claim 9, wherein, for the last block, the processing step of the refractive index distribution calculation is performed after the processing step of the three-dimensional phase image generation.

* * * * *